United States Patent [19]
Utsunomiya et al.

[11] Patent Number: 5,644,748
[45] Date of Patent: Jul. 1, 1997

[54] PROCESSOR SYSTEM INCLUDING AN INDEX BUFFER CIRCUIT AND A TRANSLATION LOOK-ASIDE BUFFER CONTROL CIRCUIT FOR PROCESSOR-TO-PROCESSOR INTERFACING

[75] Inventors: Shinichi Utsunomiya; Hideyuki Iino; Noriko Kadomaru; Makoto Miyagawa, all of Kawasaki, Japan

[73] Assignee: Fujitsu Limited, Kawasaki, Japan

[21] Appl. No.: 11,761

[22] Filed: Feb. 1, 1993

[30] Foreign Application Priority Data

Jan. 30, 1992 [JP] Japan .................................. 4-015567
Jan. 31, 1992 [JP] Japan .................................. 4-016929

[51] Int. Cl.$^6$ .................................................. G06F 12/10
[52] U.S. Cl. ................................................................ 395/417
[58] Field of Search ................................... 395/400, 417; 364/DIG. 1, DIG. 2, 200, 900; 365/189.05, 189.12

[56] References Cited

U.S. PATENT DOCUMENTS

| | | | |
|---|---|---|---|
| 4,910,668 | 3/1990 | Okamoto et al. ....................... | 395/417 |
| 4,945,548 | 7/1990 | Iannarone et al. ....................... | 375/214 |
| 4,961,169 | 10/1990 | Matsumura et al. ................ | 365/189.12 |
| 5,083,269 | 1/1992 | Syobatake et al. ....................... | 395/427 |

*Primary Examiner*—Jack A. Lane
*Attorney, Agent, or Firm*—Staas & Halsey

[57] ABSTRACT

An index buffer circuit and a translation look-aside buffer (TLB) are provided in an address unit of a vector processor unit. The index buffer circuit incudes a plurality of buffers, an input pointer generating unit for generating an input control signal indicating which selected buffer in a buffer portion, index data shall be stored, and an output pointer generating unit for outputting a control signal indicated from which selected buffer in the buffer portion output data is to be read. The TLB translates a logical address to a physical address upon receipt of the output from the index buffer. The TLB has a least recently used (LRU) flag register which can maintain the priority even if the entries are reset and thus the entries of the TLB can be used as buffers when the vector processor unit operates as a bus slave.

11 Claims, 22 Drawing Sheets

FIG. 10

| LRU FLAG | ENTRY | | | |
|---|---|---|---|---|
| | A | B | C | D |
| 1 | 0 | 0 | 1 | 1 |
| 2 | 0 | 0 | 1 | 1 |
| 3 | 1 | 1 | 0 | 0 |
| 4 | 1 | 1 | 0 | 0 |
| PRIORITY | | | | | p : 1 WHEN ENTRY OF PRIORITY "00" MAKES HIT q : 1 WHEN ENTRY OF PRIORITY "01" MAKES HIT r : 1 WHEN ENTRY OF PRIORTY "10" MAKES HIT s : 1 WHEN ENTRY OF "11" MAKES A HIT OR WHEN A MISS IS MADE

| | AFTER RESET | T1 | T2 | T3 | T4 | T5 | T6 | T7 | T8 | T9 | T10 | T11 | T12 | T13 | T14 | T15 | T16 | T17 |
|---|---|---|---|---|---|---|---|---|---|---|---|---|---|---|---|---|---|---|
| AA1 | 0 | 0 | 0 | 0 | 0 | 0 | 0 | 0 | 0 | 0 | 0 | 1 | 1 | 1 | 1 | 1 | 1 | 1 |
| AA2 | 0 | 0 | 0 | 0 | 0 | 0 | 1 | 1 | 1 | 1 | 1 | 1 | 1 | 1 | 1 | 1 | 1 | 1 |
| AA3 | 0 | 0 | 0 | 0 | 1 | 1 | 1 | 1 | 1 | 1 | 1 | 1 | 1 | 1 | 1 | 1 | 1 | 1 |
| AA4 | 0 | 0 | 1 | 1 | 1 | 1 | 1 | 1 | 1 | 1 | 1 | 1 | 1 | 1 | 1 | 1 | 1 | 1 |
| BB | x0 | x0 | x1 | x1 | x2 | x2 | x0 | x1 | x2 | x3 | x3 | x1 | x0 | x3 | x2 | x4 | x4 | x0 |
| CC1 | 0 | 0 | 0 | 0 | 0 | 0 | 0 | 0 | 0 | 0 | 0 | 0 | 0 | 1 | 0 | 0 | 0 | 0 |
| CC2 | 0 | 0 | 0 | 0 | 0 | 0 | 0 | 0 | 1 | 0 | 0 | 0 | 0 | 0 | 1 | 0 | 0 | 0 |
| CC3 | 0 | 0 | 0 | 0 | 0 | 0 | 0 | 1 | 0 | 0 | 0 | 1 | 0 | 0 | 0 | 0 | 0 | 0 |
| CC4 | 0 | 0 | 0 | 0 | 0 | 0 | 1 | 0 | 0 | 0 | 0 | 0 | 1 | 0 | 0 | 0 | 0 | 1 |
| DD | 1 | 1 | 1 | 1 | 1 | 1 | 0 | 0 | 0 | 1 | 1 | 0 | 0 | 0 | 0 | 1 | 1 | 0 |
| EE1 | 0 | 1 | 0 | 1 | 0 | 1 | 0 | 0 | 0 | 0 | 1 | 0 | 0 | 0 | 0 | 0 | 1 | 0 |
| EE2 | 0 | 1 | 0 | 1 | 0 | 1 | 0 | 0 | 0 | 0 | 1 | 0 | 0 | 0 | 0 | 0 | 1 | 0 |
| EE3 | 0 | 1 | 0 | 1 | 0 | 1 | 0 | 0 | 0 | 0 | 1 | 0 | 0 | 0 | 0 | 0 | 1 | 0 |
| EE4 | 0 | 1 | 0 | 1 | 0 | 1 | 0 | 0 | 0 | 0 | 1 | 0 | 0 | 0 | 0 | 0 | 1 | 0 |
| FF1 | 0 | 0 | 0 | 0 | 0 | 0 | 0 | 0 | 0 | 1 | 1 | 0 | 0 | 0 | 0 | 0 | 0 | 0 |
| FF2 | 0 | 0 | 0 | 0 | 1 | 1 | 0 | 0 | 0 | 0 | 0 | 0 | 0 | 0 | 0 | 0 | 0 | 0 |
| FF3 | 0 | 0 | 1 | 1 | 0 | 0 | 0 | 0 | 0 | 0 | 0 | 0 | 0 | 0 | 0 | 1 | 1 | 0 |
| FF4 | 1 | 1 | 0 | 0 | 0 | 0 | 0 | 0 | 0 | 0 | 0 | 0 | 0 | 0 | 0 | 0 | 0 | 0 |
| LR00 | 0 | 0 | 0 | 0 | 1 | 1 | 1 | 1 | 1 | 1 | 1 | 0 | 0 | 1 | 0 | 0 | 0 | 1 |
| LR10 | 0 | 0 | 1 | 1 | 0 | 0 | 1 | 1 | 1 | 1 | 1 | 0 | 1 | 0 | 0 | 1 | 1 | 0 |
| LR01 | 0 | 0 | 1 | 1 | 1 | 1 | 0 | 0 | 1 | 0 | 0 | 0 | 1 | 1 | 1 | 0 | 0 | 0 |
| LR11 | 1 | 1 | 0 | 0 | 1 | 1 | 0 | 1 | 0 | 0 | 0 | 1 | 0 | 1 | 1 | 0 | 0 | 1 |
| LR02 | 1 | 1 | 1 | 1 | 0 | 0 | 1 | 0 | 0 | 0 | 0 | 1 | 0 | 0 | 1 | 1 | 1 | 0 |
| LR12 | 0 | 0 | 1 | 1 | 0 | 0 | 1 | 0 | 0 | 1 | 1 | 0 | 0 | 1 | 0 | 1 | 1 | 0 |
| LR03 | 1 | 1 | 0 | 0 | 0 | 0 | 1 | 0 | 0 | 1 | 1 | 1 | 1 | 0 | 0 | 1 | 1 | 1 |
| LR13 | 1 | 1 | 0 | 0 | 1 | 1 | 0 | 0 | 1 | 0 | 0 | 1 | 1 | 0 | 1 | 0 | 0 | 1 |
| TAG103 A | - | - | - | - | - | - | - | - | - | - | - | x3 | x3 | x3 | x3 | x3 | x4 | x4 |
| TAG103 B | - | - | - | - | - | - | x2 | x2 | x2 | x2 | x2 | x2 | x2 | x2 | x2 | x2 | x2 | x2 |
| TAG103 C | - | - | - | - | x1 | x1 | x1 | x1 | x1 | x1 | x1 | x1 | x1 | x1 | x1 | x1 | x1 | x1 |
| TAG103 D | - | - | x0 | x0 | x0 | x0 | x0 | x0 | x0 | x0 | x0 | x0 | x0 | x0 | x0 | x0 | x0 | x0 |

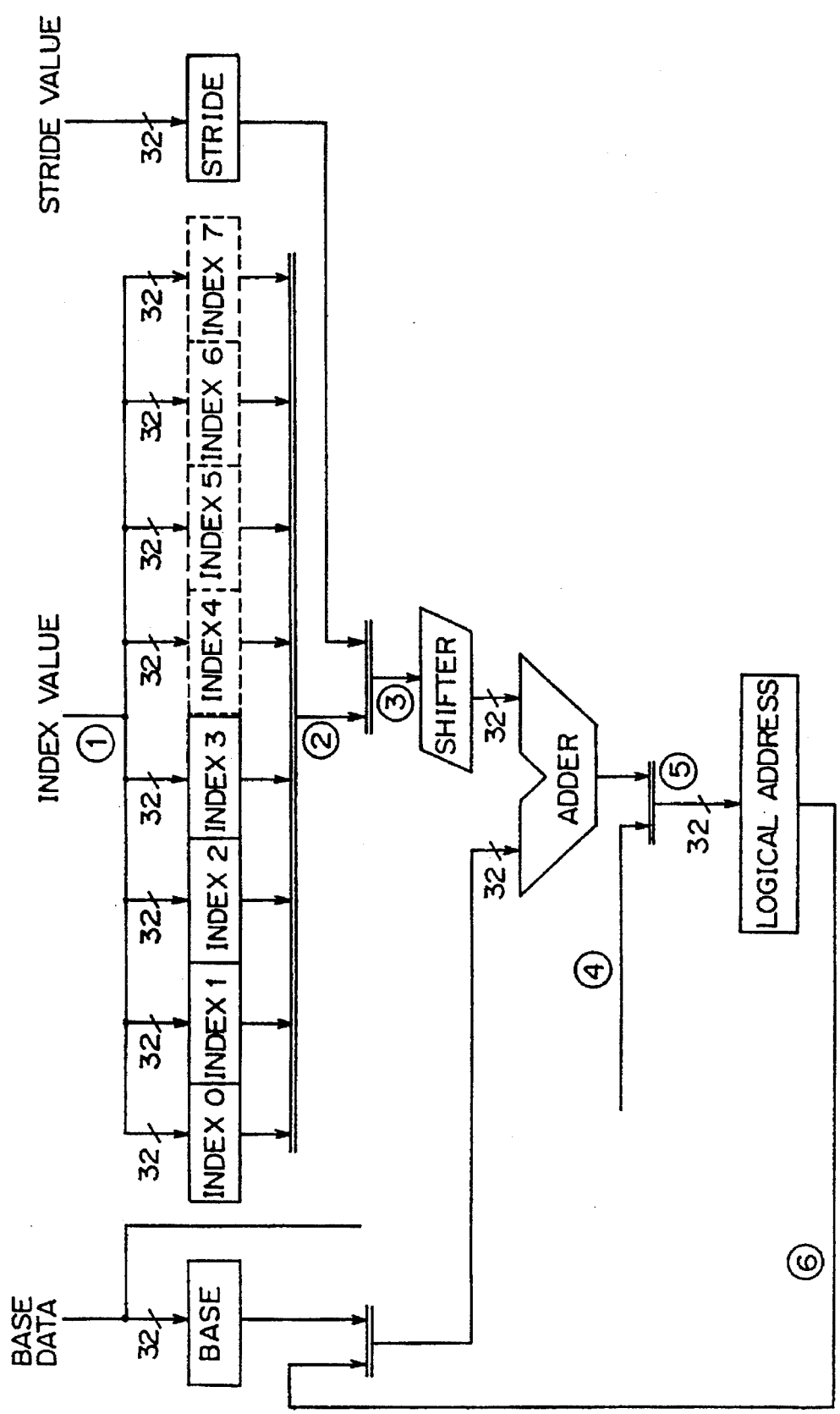

PROCESSOR SYSTEM INCLUDING AN INDEX BUFFER CIRCUIT AND A TRANSLATION LOOK-ASIDE BUFFER CONTROL CIRCUIT FOR PROCESSOR-TO-PROCESSOR INTERFACING

BACKGROUND OF THE INVENTION

1. Field of the Invention

The present invention relates to a processor-to-processor interfacing technique for a data processing system which is equipped with a processor, such as a vector processor, as well as a central processor unit (CPU), and more particularly to an address translation system using address information transferred from the CPU to the vector processor.

2. Specification

In FIG. 1, there is shown a data processing system equipped with more than one processor. This data processing system comprises a central processing unit (hereinafter abbreviated to CPU) 1, a processor 2, such as a vector processor unit (VPU) for performing arithmetic operations on vectors, and a memory unit 3, which are interconnected by a data bus (DBUS) 4, an address bus (ABUS) 5, and a control bus (CBUS) 6.

In such a data processing system, an internal interface 7 of the processor 2 accepts address index information sent from the CPU 1 over the address bus 5 and translates it to an internal address of the processor 2 for subsequent processing, for example for use in vector operations.

The problem with the address translation by the interface 7 is the difficulty of control because index data, which are sent from the CPU independently of the timing of address translation, must be translated to addresses in the order in which they are received.

Next, suppose that the processor 2 in FIG. 1 adopts an address translation method using a translation lookaside buffer (TLB). In recent years, a number of vector processor LSIs (large-scale integrated circuits) have been developed, each of which is equipped with a cache or a translation lookaside buffer in order to speed up processing.

Such processors have a problem of data agreement assurance for contents of the cache or the translation lookaside buffer. As for the cache, since an entry consists of a physical address and data and comparison between physical addresses is easy, the problem of data assurance can be solved by monitoring the system bus to detect rewriting of data corresponding to an entry in the cache and making the corresponding entry invalid upon detecting the rewriting.

However, regarding the translation lookaside buffer, since only pairs of logical and physical addresses are entered into the buffer and the address assigned to the buffer itself is not held, the data assurance problem cannot be solved in the same way as with the cache.

Thus, the processors are required to be equipped with a TLB control circuit that can make entries in the TLB invalid as necessary.

Each entry in a conventional TLB is provided with a V flag storage unit such as shown in FIG. 2 to indicate whether it is valid or invalid. The V flag storage unit comprises a V flag register 8 for storing a V flag, an inverter 9 supplied with a signal FF indicating that the physical address for the entry is to be updated when its priority has been decreased to the lowest and the TLB misses, and a NOR gate 10 supplied with the output of the inverter 9 and an address space switching signal, i.e., a signal indicating that the contents of an external RAM managed by the operating system (OS) have been rewritten, which is supplied by the OS. The output of the NOR gate is connected to the V flag register 8.

The V flag register 8 is reset by a system reset signal from the CPU 1 end set by a state signal EE output from a bus unit which controls the transfer of data to or from the data bus 4 within the vector processor unit 2. The state signal EE is a signal indicating TLB updating cycles, which is one of the signals produced by the bus unit and indicates internal states of the vector processor unit.

Of the above signals, the address space switching signal and the signals FF and EE are all "1" when they are active. The address space switching signal is common to all the entries in the TLB, while the signals FF and EE are associated with single entry having a one-to-one correspondence with the V flag register 8. For example, when the signal FF indicating a TLB miss is input and then the contents of the corresponding entry are updated, the V flag is set to one.

A flag value of 1 in the V flag register 8 indicates that the corresponding TLB entry is valid, while a flag value of 0 indicates that it is invalid.

In the above arrangement, when the address space switching signal becomes active to change the address space, a 1 input is applied to one of the inputs of the NOR gate 10, causing a 0 to be written into the V flag register 8. When 0s are written into all the V flag registers 8, all the TLB entries are made invalid.

Heretofore, the TLB is configured such that the flag registers indicating priorities of the TLB entries, for example, the contents of LRU flag registers to be described later, when reset, indicate a fixed order of priority. This is in order to keep a fixed order of priority even if the flag registers indicating priorities of the TLB entries are cleared on reset.

In a general system configuration, a numeric arithmetic processor connected to the CPU works by coprocessor/slave access in response to address/data from the CPU. Further, a processor that is also specialized for graphic processing may occupy a data bus and work as a bus master.

While the processor acts as a bus slave, it is necessary to invalidate all the entries in the TLB when the installed RAM with the TLB (page table base) is subjected to a write.

Further, in order to invalidate the entry, it is necessary to provide dedicated hardware, thereby making a circuit construction complicated. The conventional processor is structured such that a flag bit register designating a priority of respective entries in the TLB represent a predetermined sequence of the priority when the entries are reset. Therefore respective entries including the flag bit register can not be used for the other purpose even if they are reset, thereby failing to utilize the hardware resource efficiently.

SUMMARY OF THE INVENTION

An object of the present invention is to provide a processor with an address unit in which a TLB can perform an address translation efficiently by receiving an output from an index buffer.

Another object of the present invention is to provide an index buffer for performing an address translation in the order in which the index data is provided thereto and for performing the same with simple control by providing an index circuit to an interface portion of the index buffer circuit.

A further object of the present invention is to provide a processor whose circuit construction is simplified and which efficiently utilize the hardware resources.

A feature of the present invention resides in a processor having an address unit with an index buffer circuit comprising a buffer, an input pointer generating means for generating an input control signal designating in which buffer in a buffer circuit, index data is to be stored, an input selecting means for selecting the index data based on the input control signal, thereby storing it in a predetermined buffer, an output pointer generating means for outputting a control signal designating from which buffer in the buffer portion the output data is to be read, and output selecting means for selecting output data based on the control signal, thereby outputting it.

Another feature of the present invention resides in a processor having an address unit provided with a TLB control circuit comprising a TLB for storing a translation pair comprising a logical address and physical address for use in address translation, a first information storing means for storing information designating whether respective entries of the TLB are valid or invalid, a second information storing means for storing information designating a priority in respective entries in the TLB, a priority designating means for designating a predetermined priority for respective entries when all the data to be stored in the second information storing means are "0", comparison judging means for comparing the logical address previously determined for respective entries in the TLB with the comparison data received from an outside unit and judging based on the comparison result whether the comparison data is a hit in the TLB or not, logical address storing means for storing the logical address to be supplied to the comparison judging means and for performing an updating operation of the logical address based on the updated data sent from the outside unit based on the judgment result obtained from the comparison judging means, and exception information storing means for storing exception information for the logical address storing means and updating the exception information based on the updating data sent from the outside unit simultaneously with the updating operation of the logical address storing means.

A further feature of the present invention resides in the processor wherein the information to be stored means for designating a validity of an entry provided in a TLB in the first information storing is generated based on an address space switching means notifying a switching operation of an address space and an installed memory write signal notifying the installed memory of a write operation and where the processor operates as bus slave with regard to a system bus, an address translation operation is stopped and the respective entries are used as a data storing means.

BRIEF DESCRIPTION OF THE DRAWINGS

FIG. 10 shows a priority designated by respective LRU flag entries;

FIG. 16 shows the contents of the table after the updating and before the updating of the LRU flag;

FIG. 18 shows an example of the signal at respective operating cycles in the TLB circuit according to the third embodiment of the present invention;

FIGS. 21A and 21B shows a block diagram of an address unit in which the index buffer and the TLB are provided.

DESCRIPTION OF THE PREFERRED EMBODIMENTS

Figure 3:
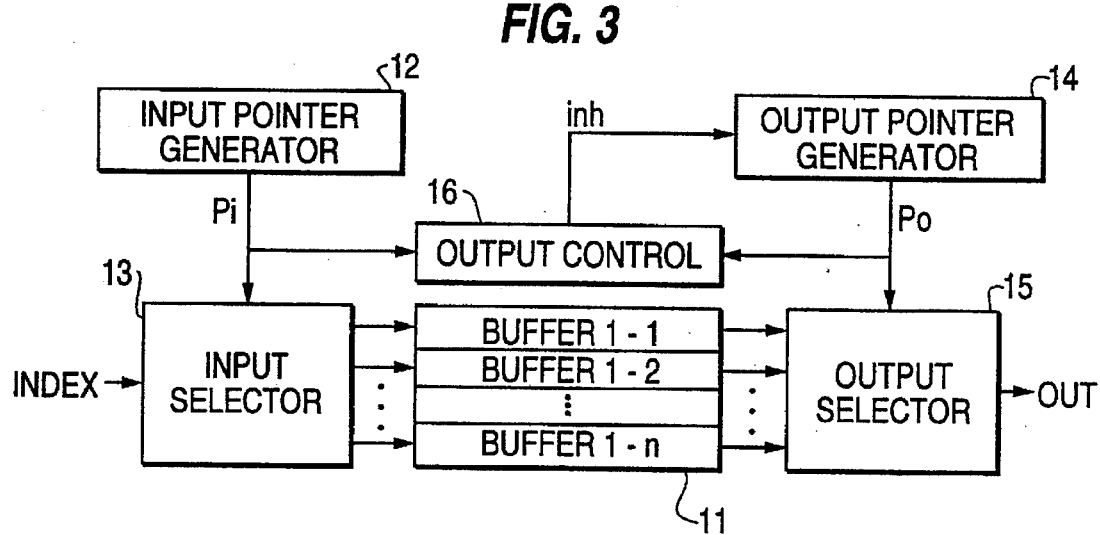
FIG. 3 shows a block diagram of a principle structure of the first and second embodiments according to the present invention.

FIG. 3 illustrates, in block form, the basic arrangement of the first and second embodiments of the present invention. More specifically, FIG. 3 is a basic block diagram of embodiments which are configured to correctly execute address translation of index data supplied from the host CPU in the order in which the index data are supplied. That is, these embodiments solve the first problem which was described previously.

The first embodiment, which is not provided with the output controller 16 shown in FIG. 3, comprises a buffer section 11 having n buffers 1-1 to n-1 an input pointer generator 12 for outputting an input control signal pi indicating into which buffer in the buffer section 11 index data INDEX is to be stored, an input selector 13 responsive to the input control signal pi to select one of the buffers 1-1 to 1-n into which the index data is to be stored, an output pointer generator 14 for outputting an output control signal po indicating from which buffer in the buffer section output data OUT is to be taken, and an output selector 15 responsive to the output control signal po to select output data OUT of that buffer specified by the control signal po.

The second embodiment further comprises the output controller 16 which, when output data is to be taken from a buffer 1-k, but the contents of it have not been updated, outputs an output inhibit signal inh to disable the output pointer generator 14.

According to the first embodiment of the present invention, the input pointer generator 12 outputs an input control signal pi indicating into which buffer 1-k index data INDEX is to be stored, and the input selector 13 is responsive to the input control signal pi to select the buffer 1-k, whereby the index data is stored into the buffer 1-k. Further, the output pointer generator 14 outputs an output control signal po indicating from which buffer 1-k output data is to be taken, and the output selector 15 is responsive to the output control signal to select the buffer 1-k, whereby the output of the buffer is obtained.

Figure 1:
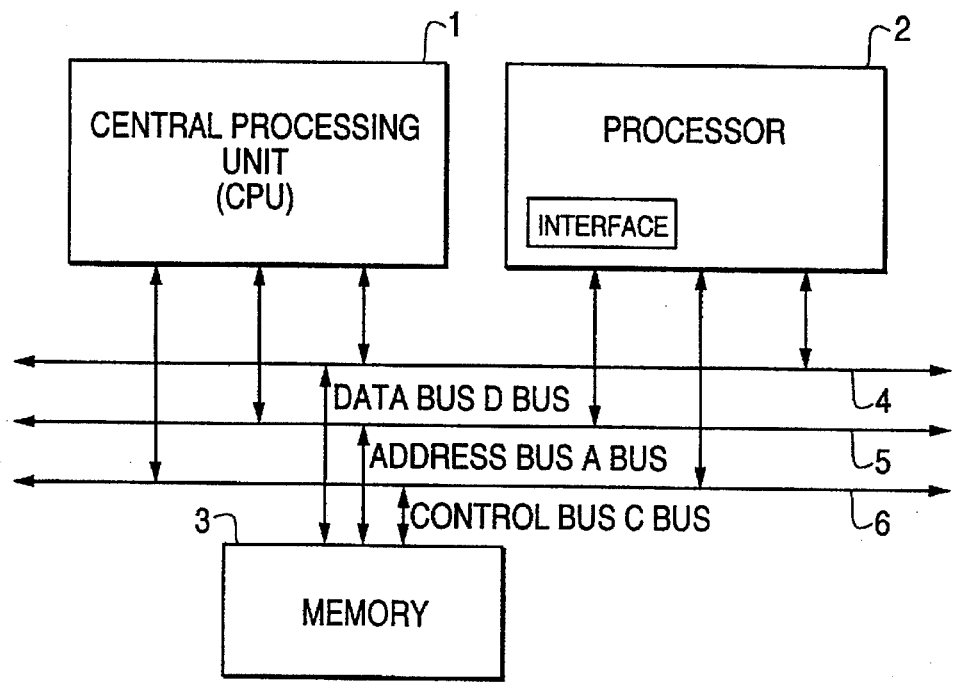
FIG. 1 shows a block diagram of a structure of the data processing system provided with a plurality of processors.

Therefore, output data can be obtained in the same order as that in which index data are input by synchronizing resetting of the pointer (indicating the location of a buffer into which index data is to be stored next) generated by the input pointer generator 12 to the resetting of the pointer (indicating the location of a buffer from which data is to be taken next) generated by the output pointer generator 14, the updating of the pointer of the input pointer generator 12 to the input timing of index data INDEX, and the updating of the pointer of the output pointer generator 14 to the operation of a unit (including the interface shown in FIG. 1) for processing output data, i.e., address translating index data. This permits address translation to be made easily.

In the second embodiment of the present invention, on the other hand, if the contents of a buffer 1-k have not been updated at the time output data OUT is to be taken from the buffer section 11, the output controller 16 outputs an output inhibit signal INH to stop the output control operation of the output pointer generator 14. Thus, even if the input pointer generator 12 and the output pointer generator 14 are not coincident in pointer update timing with each other at all, timing control is performed so that the timing of inputting of index data INDEX may not fall behind the timing of outputting of the index data as output data OUT. This prevents index data that has not been updated from being accessed on the output side.

Figure 4A:
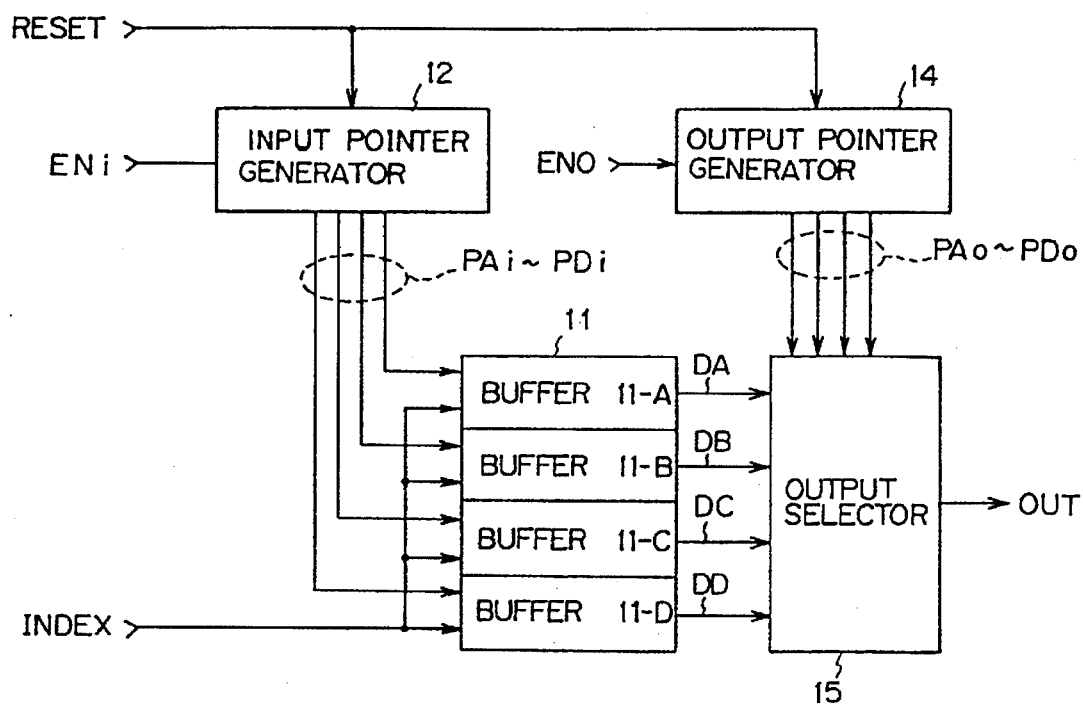
FIG. 4A shows a block diagram of a structure of an index buffer circuit in the first embodiment of the present invention.

FIG. 4A is a block diagram of an index buffer circuit which is configured to store four pieces of index data according to the first embodiment. The index buffer circuit comprises buffer circuit 11 having four buffers 11-A to 11-D, input pointer generator 12 which outputs input control signals PAi to PDi indicating into which buffer index data INDEX is to be stored, output pointer generator 14 which outputs output control signals PAo to PDo indicating from which buffer data is to be output, and output selector 15 responsive to the output control signals PAo to PDo to take data from a buffer specified by the output pointer generator.

It is to be noted that the input selector 4 is implemented by connecting the input control signals PAi to PDi to latch enable terminals of the buffers 11-A to 11-D, respectively. Index data is stored into a buffer 11-k when its latch enable terminal is made active by Q corresponding input control signal Pki.

A signal RESET initializes the input pointer generator 12 and the output pointer generator 14 to arrange input and output pointers in the same order. After initialization, the input pointer generator 12 makes the pointers, or the input control signals PAi to PDi, active sequentially in a fixed order each time index data is input. When an input control signal PKi is made active, the corresponding buffer 11-k is allowed to store index data.

The output pointer generator 14 makes the pointers, or the output control signals PAo to PDo active sequentially in the same order as index data are input, according to the timing of address translation. When an output control signal Pko is made active, data in the corresponding buffer 11-k is output.

Figure 4B:
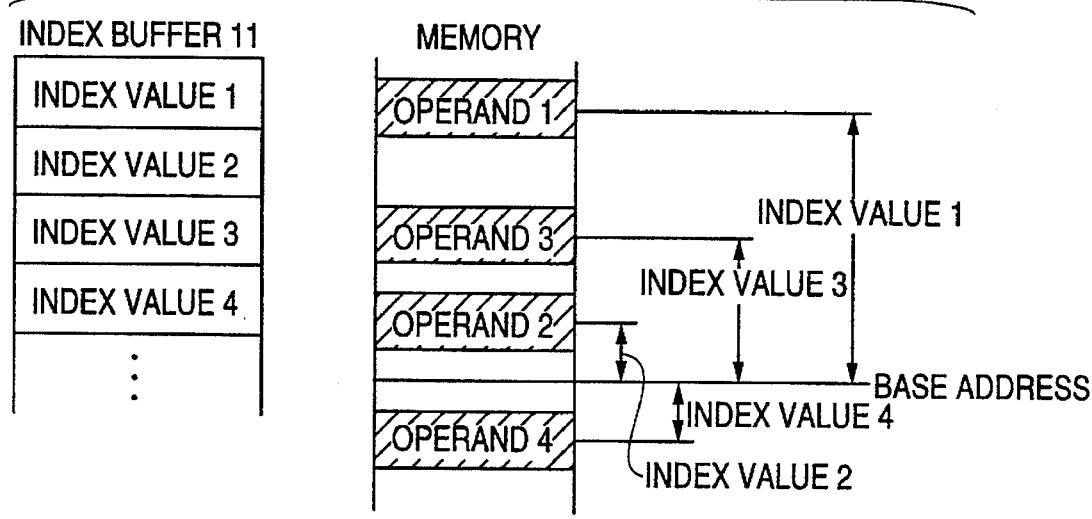
FIG. 4B shows a view of explaining an operation of the index buffer circuit.

FIG. 4B shows an operation of the index buffer 11. The index buffer stores an index value 1 to 4, for example, then the addresses of the operands 1 to 4 in the memory are determined by the index values 1 to 4 and the base address, thereby reducing the number of bits designating the addresses of the memory by using the index values 1 to 4.

Figure 5:
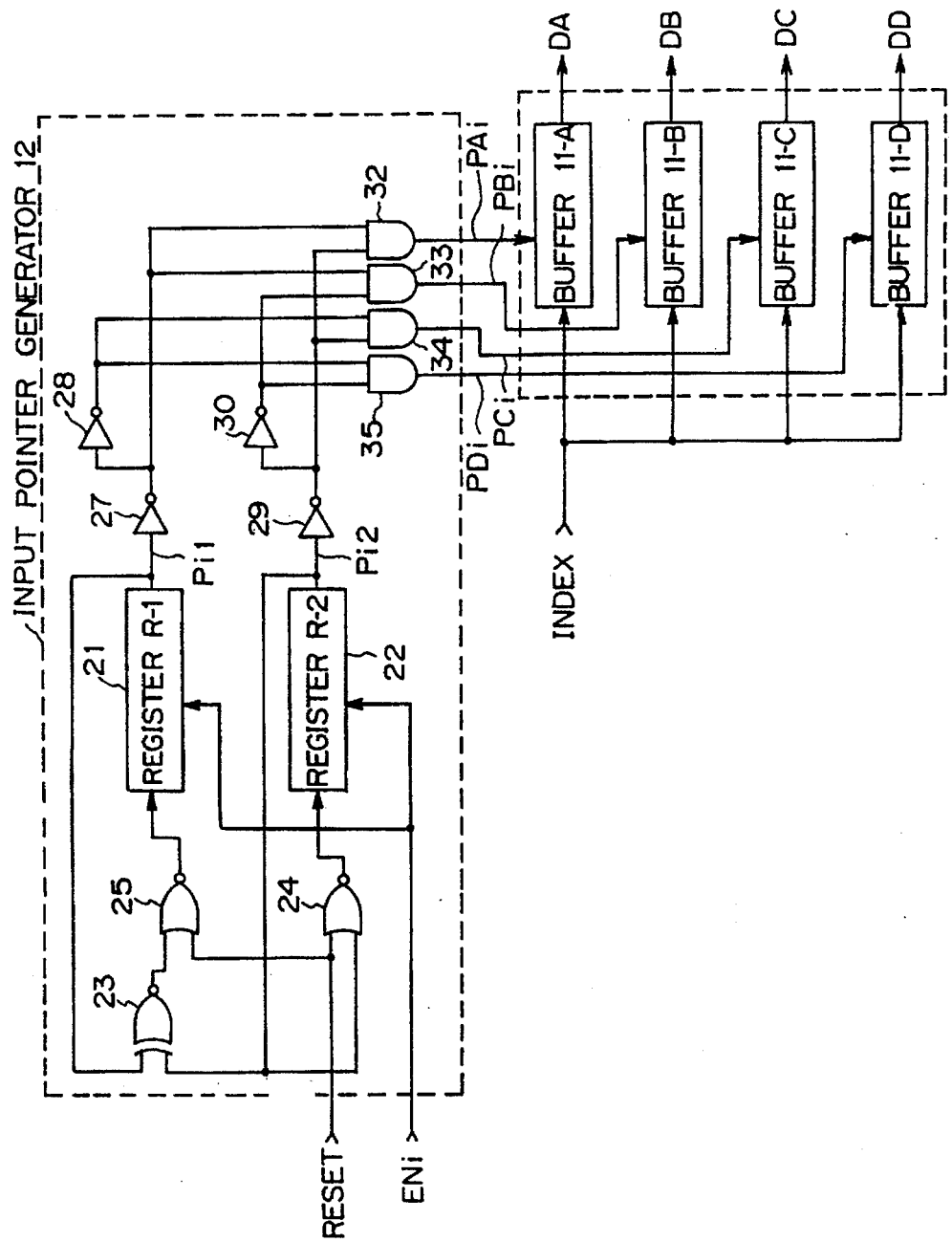
FIG. 5 shows a detailed structure of an input pointer generation unit.

FIG. 5 is a detailed circuit diagram of the input pointer generator 12.

The signal RESET initializes registers 21 and 22. When the signal RESET goes high, the registers 21 and 22 are cleared to zero. A signal Eni, which is a latch enable signal for the registers 21 and 22, controls the timing of inputting index data into the buffers 11-A to 11-D. When the signal ENi goes high, the contents of the registers 21 and 22 are updated. At this point, of outputs of AND gates 32 to 35, the input control signals PAi to PDi, input control signal Pki which is to be made active is determined, so that index data is entered into the corresponding buffer 11-k.

At the time of initialization, since outputs Pi1 and Pi2 of the registers 21 and 22 are both cleared to zero, the output of the AND gate 32, i.e., the input control signal PAi goes high (active).

The output Pi1 of the register 21 is coupled to an Exclusive NOR gate 23, while the output Pi2 of the register 22 is coupled to the Exclusive NOR gate 23 and a NOR gate 24. When the initialization signal RESET goes low, the outputs of the gates, including a NOR gate 25, are updated. The registers 21 and 22 perform a latch operation in synchronization with a clock signal (not shown). The input and output of each register are timed so that its latch operation will not be affected.

When the input enable signal mNi goes high in synchronization with the entry of index data, the contents of the registers 21 and 22 are changed to zero and one, respectively. Thus, the outputs of the registers 21 and 22 become Pi1=0 and Pi2=1. This causes the output of the AND gate 33, i.e., the input control signal PBi to go high (active), permitting the index data to be entered into the buffer 11-B.

At the time the next index data is entered, the contents of the registers 21 and 22 are updated, so that their outputs become Pi1=1 and Pi2=0. This causes the output of the AND gate 34, i.e., the input control signal PCi to go high, permitting the index data to be entered into the buffer 11-C.

Likewise, at the time of entry of the next index data, the contents of the registers 21 and 22 are updated so that Pi1=Pi2=1. This causes the output of the AND gate 35, i.e., the input control signal PDi to go high, permitting the index data to be entered into the buffer 11-D.

Further, at the time of entry of the next index data, the contents of the registers 21 and 22 are updated so that Pi1=Pi2=0. Thus, the input control signal PAi is made active with the result that the index data is entered into the buffer 11-A.

In this way the contents of the buffer circuit 11 are updated.

Figure 6:
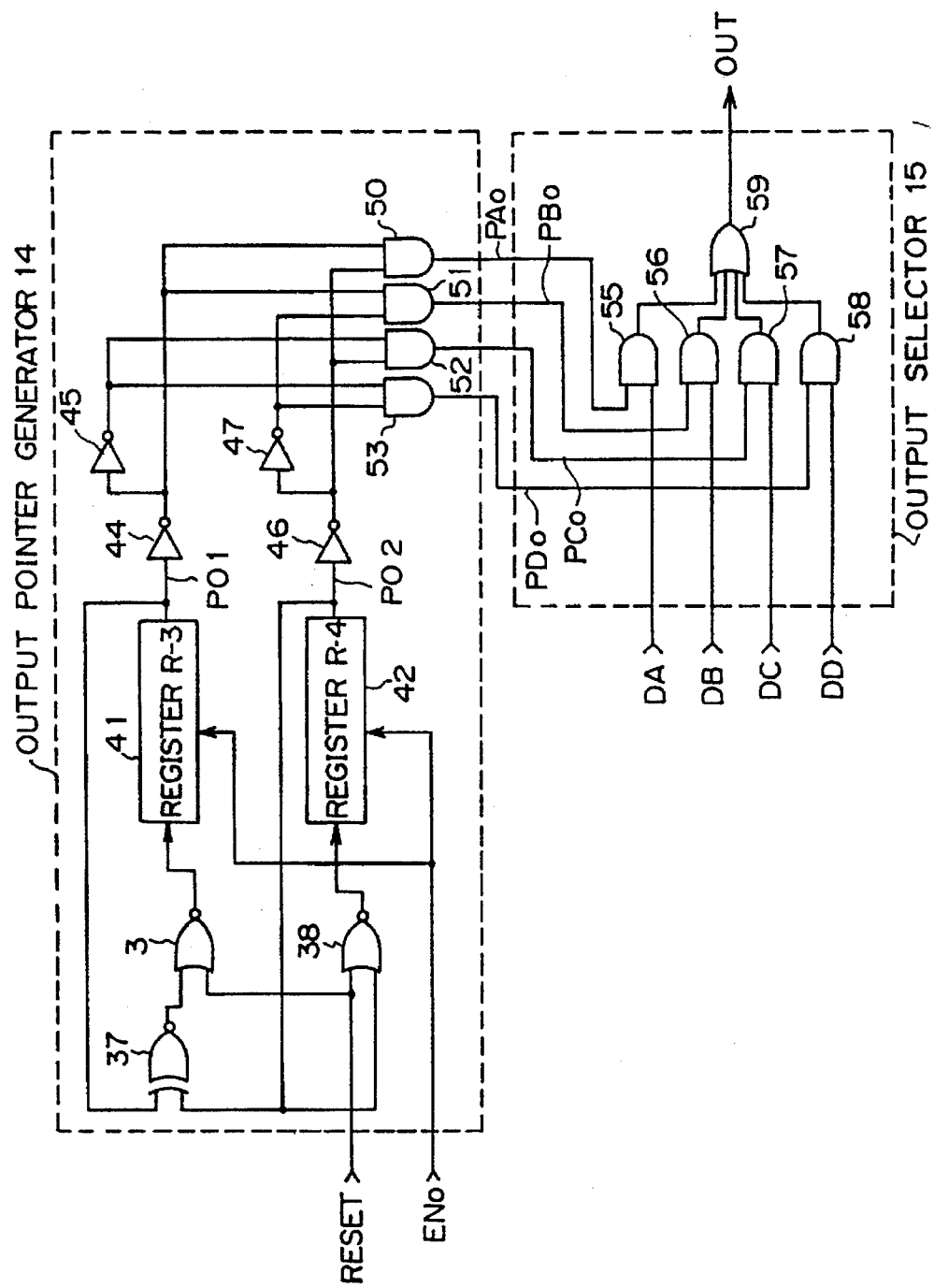
FIG. 6 shows a detailed structure of an input pointer generation unit and output selecting unit.

Referring now to FIG. 6, there are shown detailed arrangements of the output pointer generator 14 and the output selector 15.

The output pointer generator 14 is the same in arrangement as the input pointer generator 12 except that the output enable signal ENo is connected to the latch enable terminals of registers 41 and 42. The output enable signal ENo is made high at the time of address translation. At this point the contents of the registers 41 and 42 are updated.

The initialization signal RESET for the output pointer generator, which is the same as that for the input pointer generator 12, is made high at the time of initialization, clearing the contents of the registers 41 and 42 to zero. This permits alignment of the input and output pointers.

As a result of initialization, the outputs Po1 and Po2 of the registers 41 and 42 become zeros, causing the output of an AND gate 50 to go high (active). This permits the output PAo of the buffer 11-A to be selected as output data OUT.

In outputting data from the buffers, they are selected in the same order am they receive index data INDEX, i.e., in the order buffer 11-A, buffer 11-B, buffer 11-C, buffer 11-D, buffer 11-A, etc.

The setting of the number of the index buffers depends on the difference between the timing of index data entry and the timing of address translation. In general, a timing difference occurs only in the preparatory stage for address translation after initialization. No timing difference will occur during address translation.

If, however, a time difference should occur even during address translation, in order to prevent the address translating section from referring to old index data, it is required to ensure that the time of address translation is not earlier than the time of index data entry.

Figure 7:
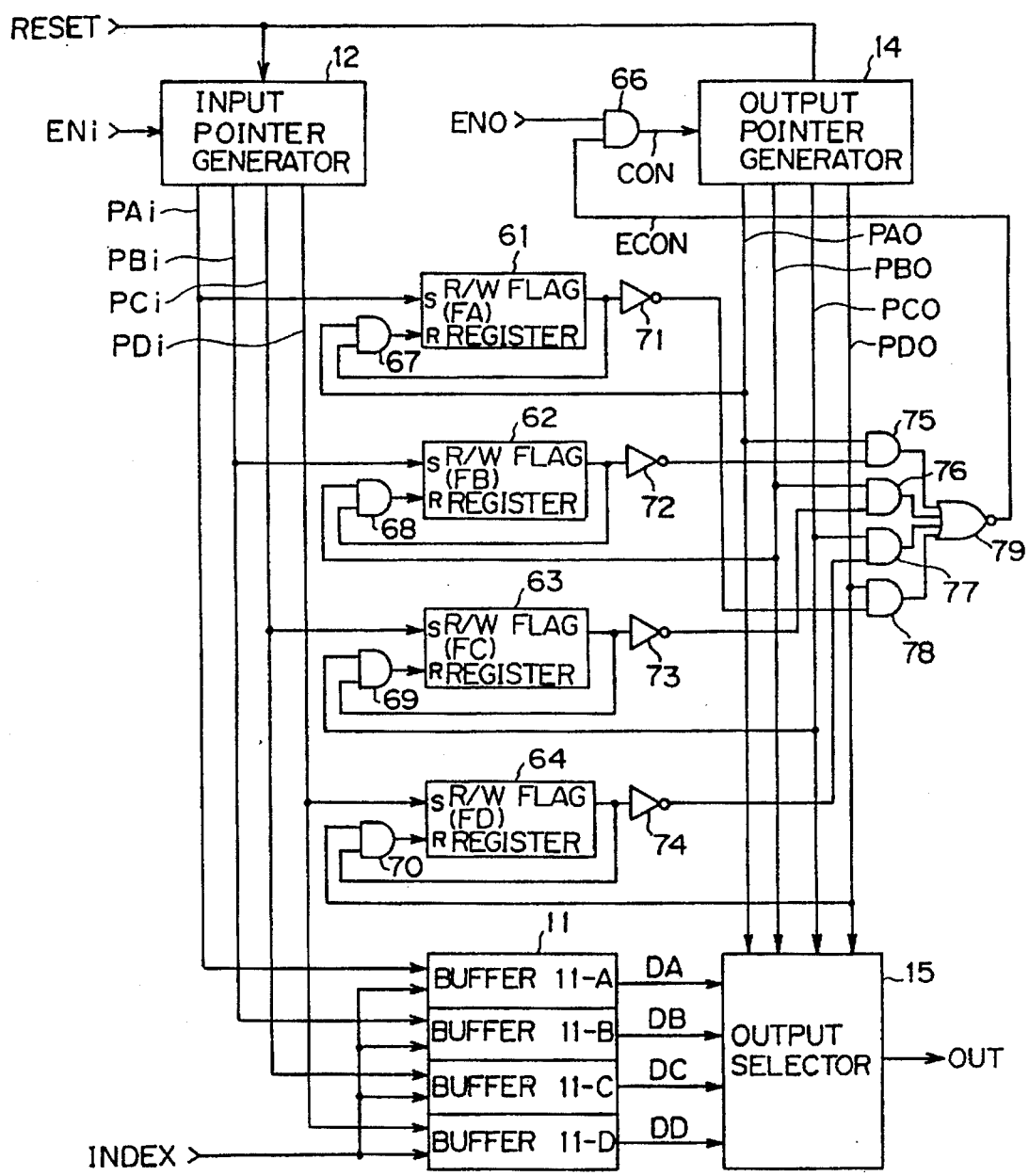
FIG. 7 shows a block diagram of the second embodiment of the present invention.

A second embodiment of the index buffer circuit that meets that requirement will be described below with reference to FIG. 7.

In the index buffer circuit according to the second embodiment, each of the index buffers is provided with an R/W flag. Thereby, the output pointer generator 14 is controlled according to whether or not each of the buffers has been updated.

As described above, the index buffer circuit of the second embodiment is provided with the output controller 16 that is an addition to the index buffer circuit according to the first embodiment. The output controller 16 comprises registers 61 to 64 for storing read/write flags (hereinafter referred to as R/W flags) FA to FD, gate circuits 75 to 79 for outputting an enable inhibit signal ECON according to the contents of the R/W flags FA to FD, AND gates 66 to 70, and inverters 71 to 74. The registers 61 to 64 are provided to correspond with the buffers 11-A to 11-D.

The signal RESET initializes the input pointer generator 12 and the output pointer generator 14. The signal ENi is a latch enable signal for the registers 21 and 22 In the input pointer generator 12, while the signal ENo is a latch enable signal for the registers 41 and 42 in the output pointer generator 14. More accurately, the output enable signal ENo is ANDed with the enable inhibit signal ECON by the AND gate 66, the output signal CON of which is used as the latch enable signal for the registers 41 and 42.

The output signals PAi to PDi of the input pointer generator 12 serve as input control signals PAi to PDi or input pointers. When one of the input control signals Pki is made active, index data is entered into the corresponding buffer 11-k. The output signals PAo to PDo of the output pointer generator 14 serve as output Control signals PAo to PDo or output pointers. When one of the output control signals Pko is made active, the corresponding buffer 11-k provides its contents as output data OUT.

To implement each of the R/W flag storing registers 61 to 64, a clock-controlled S/R-FF latch may be used, which is reset by a corresponding input control signal Pki and set by a corresponding output control signal Pko.

The registers 21 and 22 (FIG. 5) in the input pointer generator 12 are initialized by the signal RESET and updated by the signal ENi. The registers 41 and 42 (FIG. 6) in the output pointer generator 14 are initialized by the signal RESET and updated by the signal ENo.

The updating of the registers 41 and 43 in the output pointer generator 14 is allowed only when the R/W flag Fk corresponding to a buffer 11-k from which data is to be next output is set. That is, when the corresponding flag Fk is not set, since the enable inhibit signal ECON is made active (low), the signal CON is also made low.

When new index data is stored in a buffer 11-k from which data is to be output next, the corresponding R/W flag Fk is set by the corresponding input control signal Pki from the input pointer generator 12. Thus, the enable inhibit signal ECON is made inactive (high), so that the signal CON goes high. This permits the registers 41 and 42 in the output pointer generator to be updated.

Any R/W flag Fk is reset when a signal at a high level is output from the R/W flag Fk register corresponding to the buffer 11-k pointed to by the high output control signal Pko from the output pointer generator 14.

As described above, owing to provision of the output controller 16 the second embodiment permits address translation to be made without allowing access to index data which has not been updated.

As described above, the present embodiments determine in which buffer the index data is to be stored, based on the input pointer generating unit and the input selecting unit and stores the index data in the buffer to be stored and determines from which buffer the output data is to be output based on the output pointer generating unit and output selecting unit, thereby outputting the output data from the selected buffer and therefore can provide the output data in the same order as the index data is input to the index buffer and can provide an index buffer circuit which can be controlled in a simple manner.

Further the present embodiment stops the output control of the output pointer generating unit where the content of the buffer is not yet updated when the output data is obtained from the buffer, and therefore, can perform a control so that the timing for outputting the output data does not become earlier than that of inputting the index data even if the timing of updating the pointer in the input pointer generating unit is different from that of updating the pointer in the output pointer generating unit and can stop accessing the index data which is not yet updated in the output side.

Figure 8:
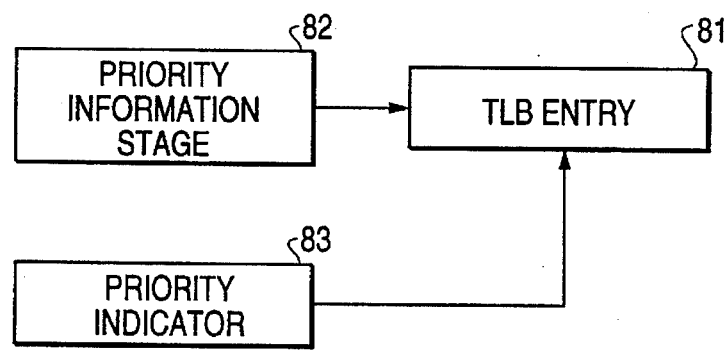
FIG. 8 shows a block diagram of a principle structure of the third embodiment according to the present invention.

FIG. 8 illustrates the fundamental principle of a third embodiment of the present invention, which is intended to ensure effective use of hardware resources when address translation is not needed in an address translation system using an address translation table TLB, or more specifically, to attain the third object of the present invention. This embodiment carries out address translation by the use of a translation lookaside buffer (TLB) storing translation pairs of logical and physical addresses for address translation.

Figure 2:
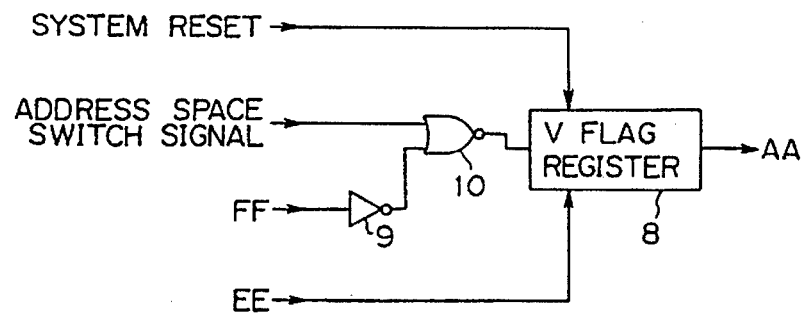
FIG. 2 shows a block diagram of a conventional V flag storing unit.

In FIG. 8, such entry 81 in address translation table TLB is provided with a priority information storage 82 for storing information indicating priority assigned for the entry when the V flag (the contents of the V flag register in FIG. 2) for the entry indicates validity, and a priority indicator 83 for indicating a predetermined priority previously assigned for each entry in order to permit other data to be stored in the register constituting the priority information storage 82, for example, the LRU flag register in a state where the priority information stored in the storage 82 is made zero. Here, the priority refers to the order of updating physical addresses of the entries, beginning with the lowest priority entry.

Figure 9:
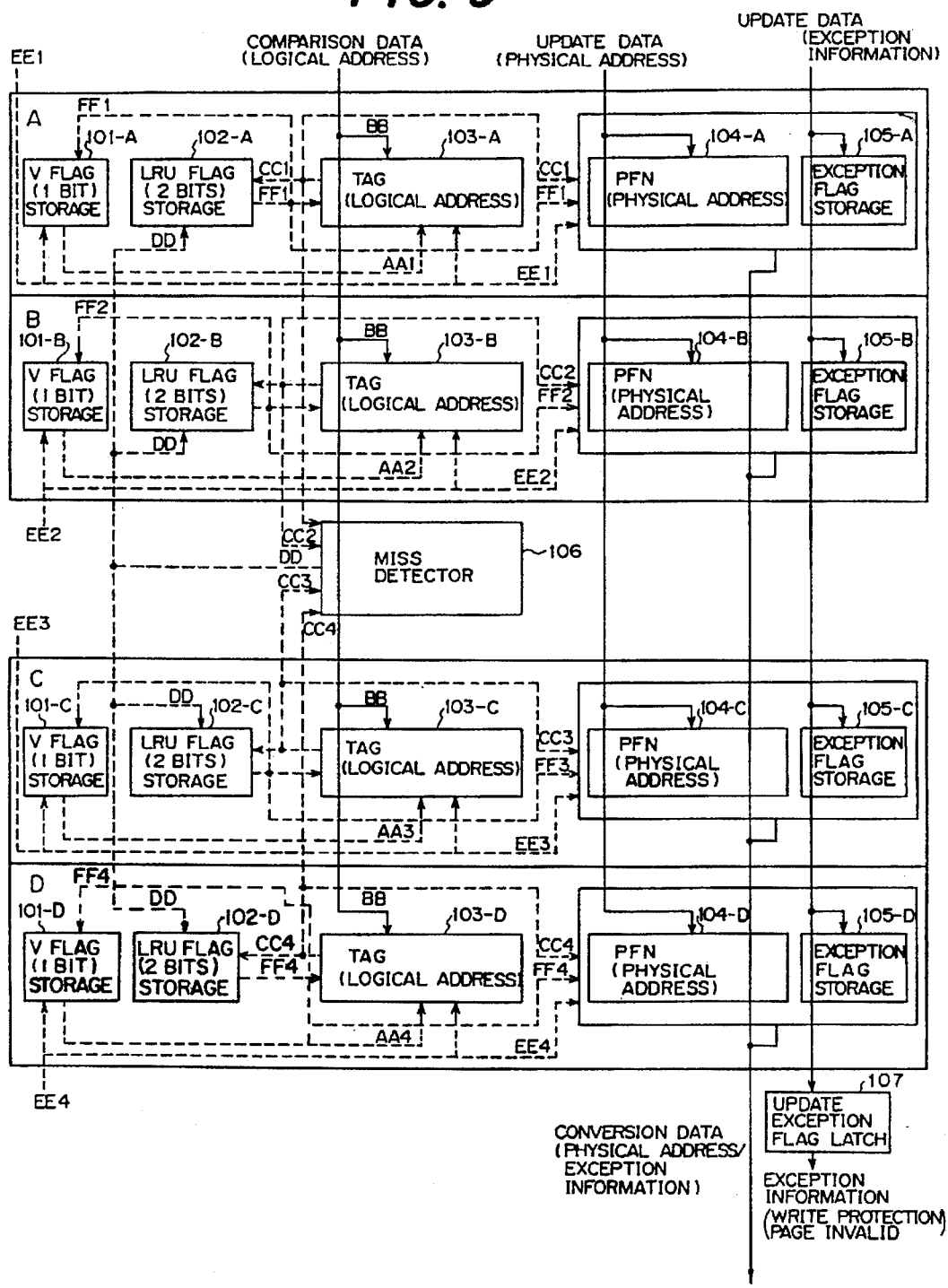
FIG. 9 shows a block diagram of a structure of a TLB circuit according to the third embodiment of the present invention.

FIG. 9 is a block diagram of a TLB circuit according to the third embodiment of the present invention. The TLB circuit is provided with four entries A to D each of which comprises a V flag storage section (101-A to 101-D) for storing a V flag indicating that the corresponding entry is valid or invalid, an LRU flag storage section (102-A to 102-D) serving as both the priority information storage 82 and the priority indicator 83 in FIG. 8, a TAG section (103-A to 103-D) for making a comparison between a logical address externally supplied as address data and a logical address stored internally, a PFN section (104-A to 104-D) for storing a physical address corresponding to the internally stored logical address, and an exception flag storage (105-A to 105-D) for storing exception information. In common with the four entries A to D, there are further provided a miss detector 106 which, when all the TAG sections 103-A to 103-D fail to hit physical addresses, detects it as a miss, and a latch 107 which latches an updating exception flag.

The exception information that an exception flag stored in the exception flag storage 105-A to 105-D indicates is, for example, write protection or page invalidity. The exception information is sent to the control unit of the vector processor and then latched by an internal status register. When an exception is caused, the address translation is stopped.

The V flag storage sections 101-A to 101-D are each provided with a 1-bit register indicating whether the corresponding entry is valid or invalid. When the register is cleared by resetting, the V flag for the corresponding entry is also made invalid, which is presented to the corresponding TAG section 103 by a signal AA.

When the V flag indicates invalidity, the comparison of physical address by the TAG section 103 is automatically considered a miss. When the entry of a physical address is made according to the LRU algorithm to an entry flagged to indicate that it is invalid, the V flag is altered to a flag indicating validity. At the time of next comparison of physical address, the corresponding entry is made valid.

The LRU flag storage sections, 102-A to 102-D are each provided with a 2-bit flag register so as to indicate the priority for the entries A to D by "00", "01", "10" and "11". When the flag register is cleared by resetting, the LRU flag is made "00". However, the priorities for the entries A to D are indicated by the priority indicator 83 in FIG. 8 in the order of A-B-C-D. This is because the priorities for the entries A to D indicated by the LRU flags are different as shown in FIG. 10. The LRU flags for the biggest priority for entries A to D are respectively "00", "01" and "11".

When the TLB makes a hit, that is, when one of logical addresses stored in the entries in the TLB coincides with a logical address externally applied as comparison data, the contents of the LRU flag register in that entry which has made a hit are altered (updated) to the highest priority. When the TLB makes a miss, on the other hand, the V flag storage sections 101-A to 101-D, the TAG sections 103-A to 103-D, and the PFN sections 104-A to 104-D are notified that the contents of the LRU flag register only in the entry indicating the lowest priority are altered to the highest priority (see signals FF1 to FF4 in FIG. 9).

The TAG sections 103-A to 103-D are each provided with a register having a logical address and make comparisons simultaneously to detect hit or miss. The results of detection are presented to the LRU flag storage sections 102-A to 102-D and the PFN sections 104-A to 104-D (see signals CC1 to CC4 in FIG. 9).

The PFN sections 104-A to 104-D are each provided with a register having a physical address corresponding to the logical address in the corresponding TAG section. When the TAG section 103 detects a hit to the input logical address (comparison data) BB (see signals CCL to CC4 in FIG. 9), the physical address is output from the corresponding PFN section. When a miss is detected by all of the TAG sections 103A to 103D, the physical address of the PFN section in the entry indicating the lowest priority is updated according to the priority (see signal FF1 to FF4 in FIG. 9) in the LRU flag register.

The exception flag register is provided with a register having exception information for the physical address in the corresponding PFN section and outputs the exception information at the same time that the physical address is output from the corresponding PFN section. When the physical address is updated, the exception information, serving as an exception flag, is also updated.

The updating exception flag latch 107, like the exception flag storage sections 105A to 105D, has exception information for a physical address. As stated above, only when the corresponding TAG section detects a hit, the exception flag storage section outputs the exception information at the same time that the physical address of the corresponding entry is output. When all the TAG sections 103A to 103D detect an entry miss, exception information for a physical address to be updated is invisible from outside. Thus, the updating exception flag latch 107 causes a copy of the exception information for the physical address to be updated, thereby permitting the exception flag to be output immediately.

Figure 11:
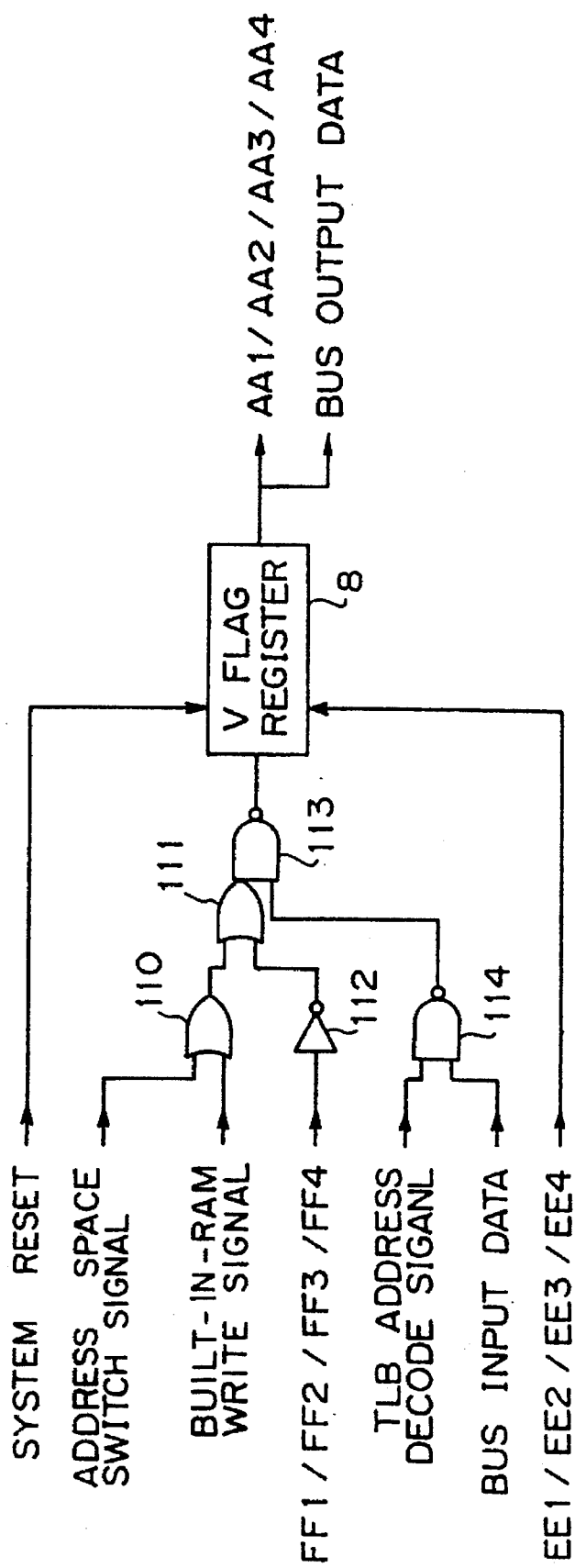
FIG. 11 shows a structure of the V flag storage unit in the third embodiment of the present invention.

FIG. 11 is a detailed arrangement of the V flag storage section of the third embodiment. This V flag section is distinct from the prior art shown in FIG. 2 in that OR gates 110 and 111, an inverter 112, and NAND gates 113 and 114 are provided in place of the inverter 9 and the NOR gate 10. To the OR gate 110 is input a built-in RAM write signal in addition to the address space changing signal. The built-in RAM write signal becomes 1 when a built-in RAM is written into, as a result of monitoring for addresses of the built-in RAM and of a write enable signal. A signal input to the inverter 112 is the same as the signal input to the inverter 9 in the prior art of FIG. 2, i.e., the signal FF1, FF2, FF3 or FF4 indicating that the priority is decreased to the lowest as a result of miss. The NAND gate 114 is supplied with bus input data input from an external bus and a TLB address decode signal for permitting the data to be entered into the V flag register when the V flag register 8 used as various types of data storage sections in the address translation operation stopped state in which the vector processor unit operates a bus slave. When the vector processor operates as a bus slave, the stored contents of the V flag register 8 are output onto an external data bus as bus output data.

FIGS. 12 to 15 illustrate detailed arrangements of the LRU (least recently used) flag storage sections 102A to 102D.

Figure 12:
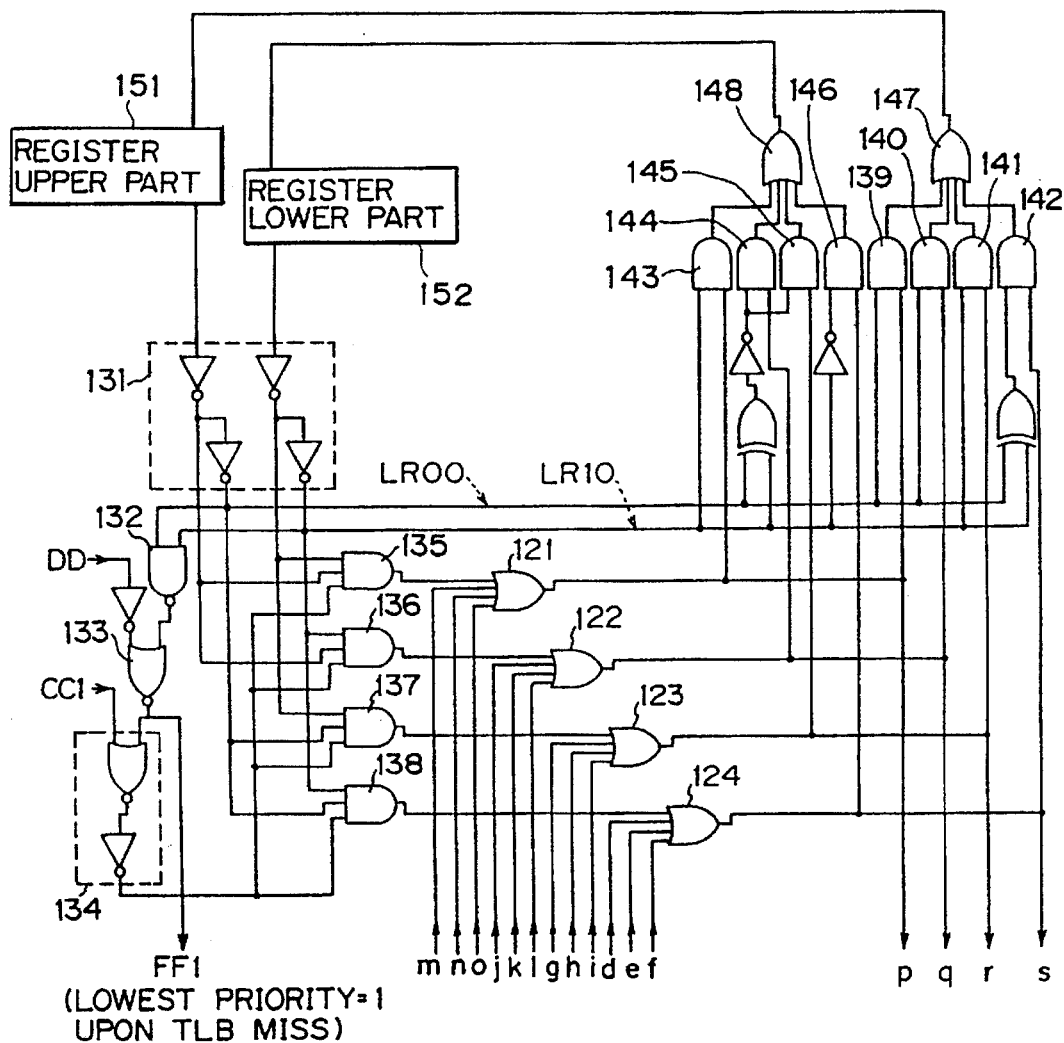
FIG. 12 shows a detailed structure of the LRU flag storage unit 102-A.
Figure 13:
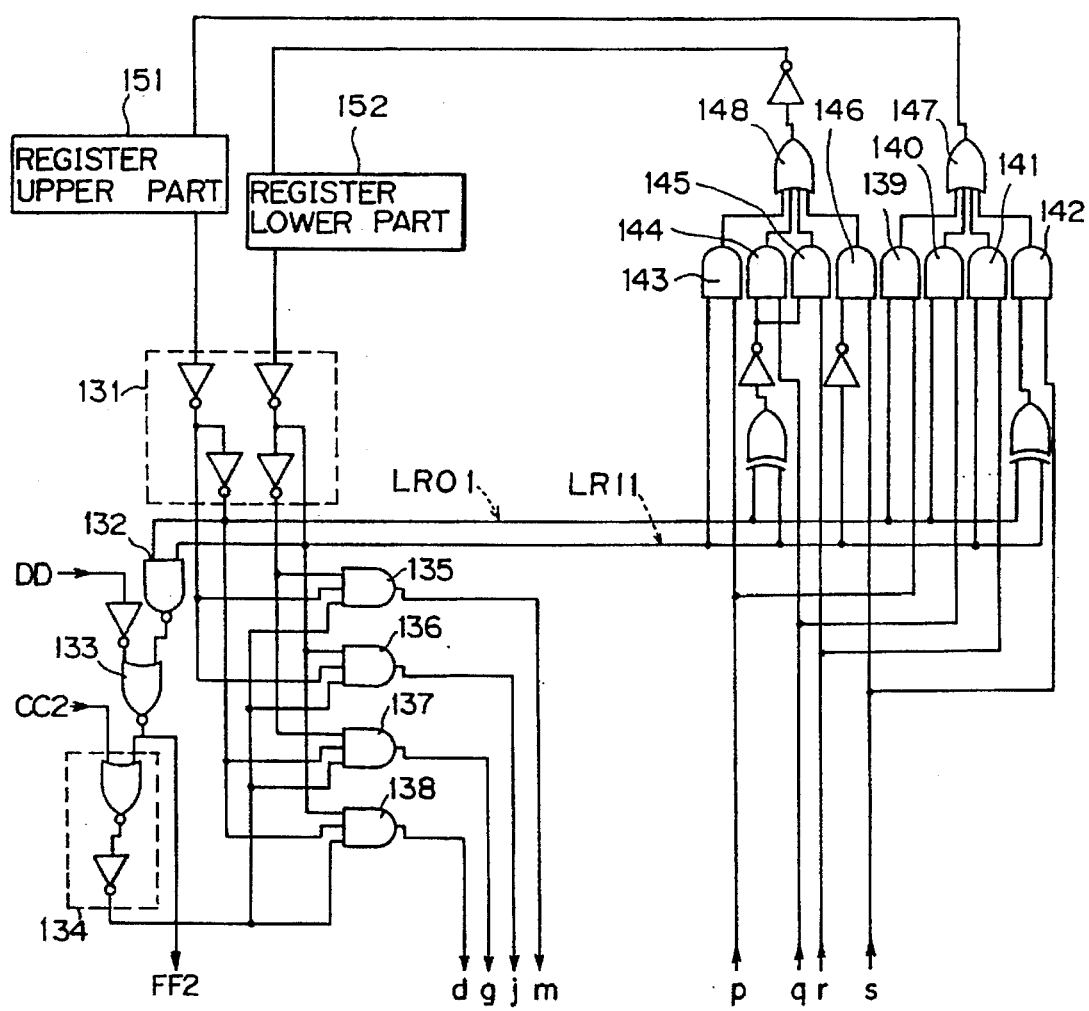
FIG. 13 shows a detailed structure of the LRU storage unit 102-B.
Figure 14:
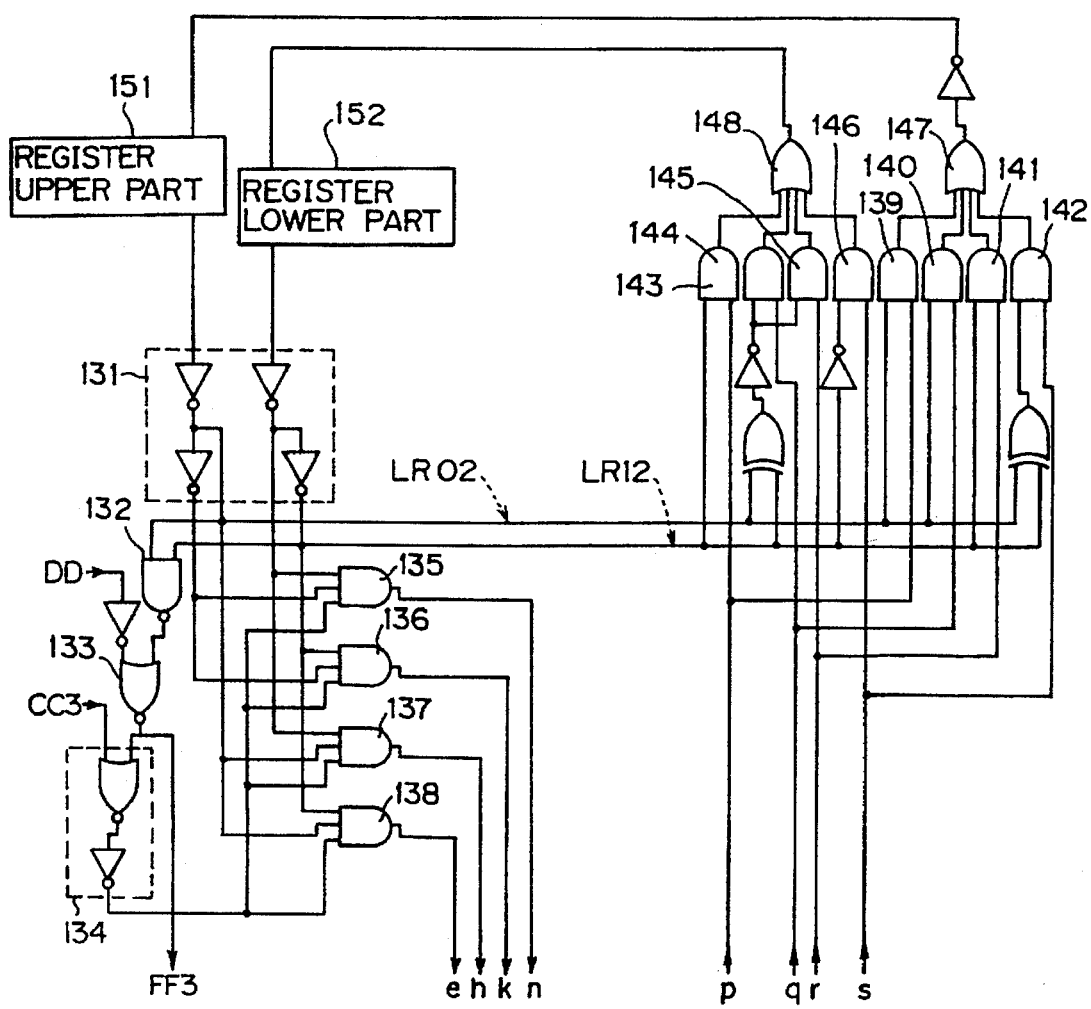
FIG. 14 shows a detailed structure of the LRU storage unit 102-C.
Figure 15:
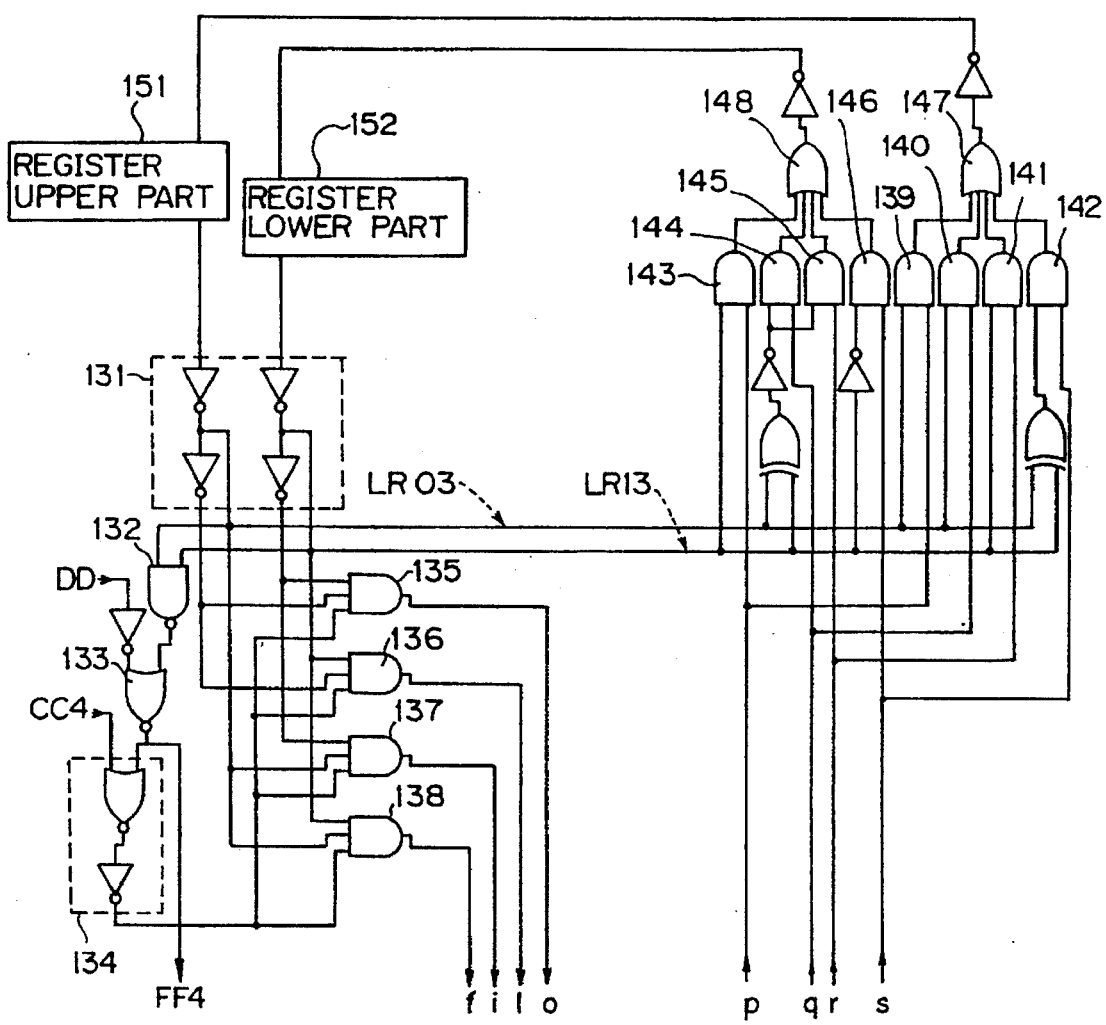
FIG. 15 shows a detailed structure of the LRU storage unit 102-D.

In the LRU flag Storage sections 102A to 102D, when their internal registers are cleared to 0s on reset, LR00/LR10 for the entry A shown in FIG. 12, LR01/LR11 for the entry B shown in FIG. 13, LR02/LR12 for the entry C shown in FIG. 14, and LR03/LR13 for the entry D shown in FIG. 15 appear as "00", "01", "10", and "11", respectively, which represent the priorities of the entries A, B, C and D.

Figure 16:
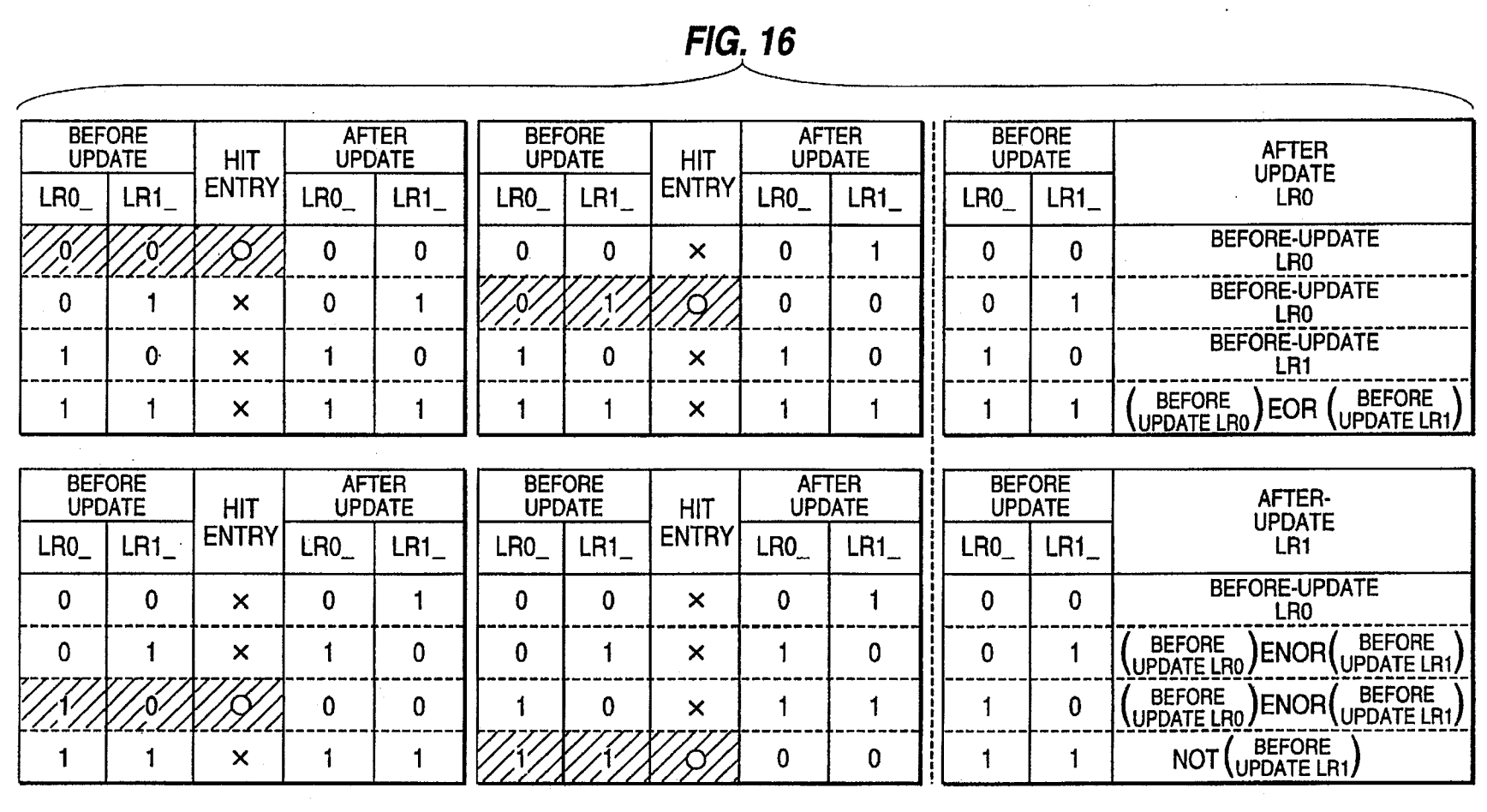

According to the LRU algorithm, the priority of an entry that made a hit is altered to a top priority, and, in case of a miss, the lowest priority entry is altered to a highest priority entry. That is, as shown in FIG. 16, (1) when the entry of the priority "00" makes a hit, its priority remains unchanged even after updating. (2) When the entry of the priority "01" makes a hit, its priority is updated such that "01" becomes "00", and "00" becomes "01". (3) When the entry of the priority "10" makes a hit, its priority is updated such that "10" becomes "00", "01" becomes "10" and "00" becomes "01". (4) When the entry of the priority "11" makes a hit, its priority is updated such that "11" becomes "00", "10" becomes "11", "01" becomes "10", and "00" becomes "01".

Consider now the priority of each entry that makes a hit in terms of its low-order and high-order parts before and after updating.

(1) When the entry of the priority "00" makes a hit, the low-order and high-order parts of the updated priority are the same as the low-order and high-order parts of the before-updating priority.

(2) When the entry of the priority "01" makes a hit, the after-updating high-order part is the same as the before-updating high-order part, and the after low-order part is the EXCLUSIVE NOR of the before low-order and high-order parts.

(3) When the entry of the priority "10" makes a hit, the after high-order part is the same as the before low-order part, and the after low-order part is the EXCLUSIVE NOR of the before low-order and high-order parts.

(4) When the entry of the priority "11" makes a hit, the after high-order part is the EXCLUSIVE OR of the before high-order end low-order parts, and the after low-order pert is the inverse of the before low-order part.

In FIGS. 12 to 15, each of the signals CC1 to CC4 is made high when the TAG section in the corresponding entry detects a hit, and the signal DD is made high by the miss detector 106 when all the TAG sections 103A to 103D detect a miss. Each of the signals FF1 to FF4, which goes high to indicate the lowest priority "11", is applied to the V flag storage section 101, the TAG section 103, the PFN section 104 and the exception flag storage section 105 in the corresponding entry.

To the entry A (FIG. 12) are input four signals d, g, j, m from the entry B (FIG. 13), four signals e, h, k, n from the entry C (FIG. 14) and four signals f, i, l, o from the entry D (FIG. 15). One of the four signals is made high when the corresponding entry makes a hit, or a miss under the priority "11", indicating what priority the entry has.

OR gates 121 to 124 shown in FIG. 12 correspond to the entries with the priorities "00", "01", "10" and "11", respectively. That is, each of the OR gates produces high output signal when the corresponding entry makes a hit. For example, the OR gate 121 makes its output high when the entry of the priority "00" makes a hit, and the OR gate 122 makes its output high when the entry of the priority "01" makes a hit. In case of a mass, the OR gate 124 makes its output high.

Signals p, q, r, s, the outputs of the OR gates 121 to 124, are applied to all the entries A to n to update the high-order and low-order parts of the LRU flags in accordance with the logic shown in FIG. 16. That is, the entries A to D ere assigned the priorities shown in FIG. 10.

The LRU flag storing unit 102-3 will be explained more in detail as follows.

The LRU flag storing portion 102-3 comprises means for setting the contents of LRU registers to "0,0" i.e. when an entry corresponding to one of the LRU registers a makes hit, and means for changing the contents of the LRU registers relating to other entries than the entry which makes the hit so that the sequence before the hit is made is maintained.

In FIG. 12, inverter group circuit 131 is connected to the upper side LRU register number and the lower side LRU register 151 and provides a complementary signal to determine the contents of the registers 151 and 152 and also operates as buffers for transmitting the output signals from the registers 151 and 152.

NAND circuit 132 detects whether the priority is the lowest ("1,1") or not. NAND gate 133 detects whether the current entry has been updated to the highest priority "0,0" when the output of the NAND gate 133 is "0", (that is, the lowest priority) and a miss occurs. The block 134 detects whether the current entry is updated to "0,0" when the output of the NAND gate 133 is "1", that is, this entry has the lowest priority and a miss occurs or this entry makes hit. AND gate 135 detects whether the output of the block 134 is "1", that is, this entry will be updated to "0,0" in the next step and the contents of registers 151 and 152 are "0,0".

AND gate 143 detects whether the output of OR gate 121 is "1", that is, an entry with priority "00" is updated and the register LR1 before updating is "1", AND gate 144 detects whether the output of OR gate 122 "1", that is, an entry with the priority "1" is updated and the result of the exclusive-NOR of the registers LR0 and LR1 before updating is "1". AND gate 145 detects whether the output of OR gate 123 is "1", that is, an entry with priority "1,0" is updated and the result of the exclusive-NOR of the registers LR0 and LR1 before updating is "1". The AND gate 146 detects whether the output of OR gate 124 is "1", that is, an entry with priority "1,1" is updated and the inverted output of the register LR1 before updating is "1", OR gate 147 detects whether any one of AND gates 139, 141 and 142 is "1", and OR gate 148 detects whether one of the gates 134, 144, 145 and 146 is "1".

As an inverter is not connected to OR gate 147 and 148 for entry A, an inverter is connected to OR gate 148 for entry B, an inverter is connected to OR gate 147, and inverters are respectively connected to OR gate 148 and 147, respective entries A to D can maintain their priorities as shown in the table of FIG. 10 even if all the entries are reset.

The priority of the LRU flags of entry A, for example, ≠ is shown in FIG. 16 (which will be described later) wherein cross-hatched portions represent the contents of respective LRU registers after updating.

In summary, blocks 131 and 134 and gates 132, 133, 135 and 138 show the status of the LRU registers of the local entry when a hit is made. OR gates 121 to 124 determine the status of the LRU registers of other entries when one of them makes a hit although the local entry does not make a hit. Gates 9 to 18 set an LRU register to a new state in accordance with the LRU algorithm shown in FIGS. 10 or 16 so that the new state can be stored in local LRU registers 151 and 152.

Figure 17:
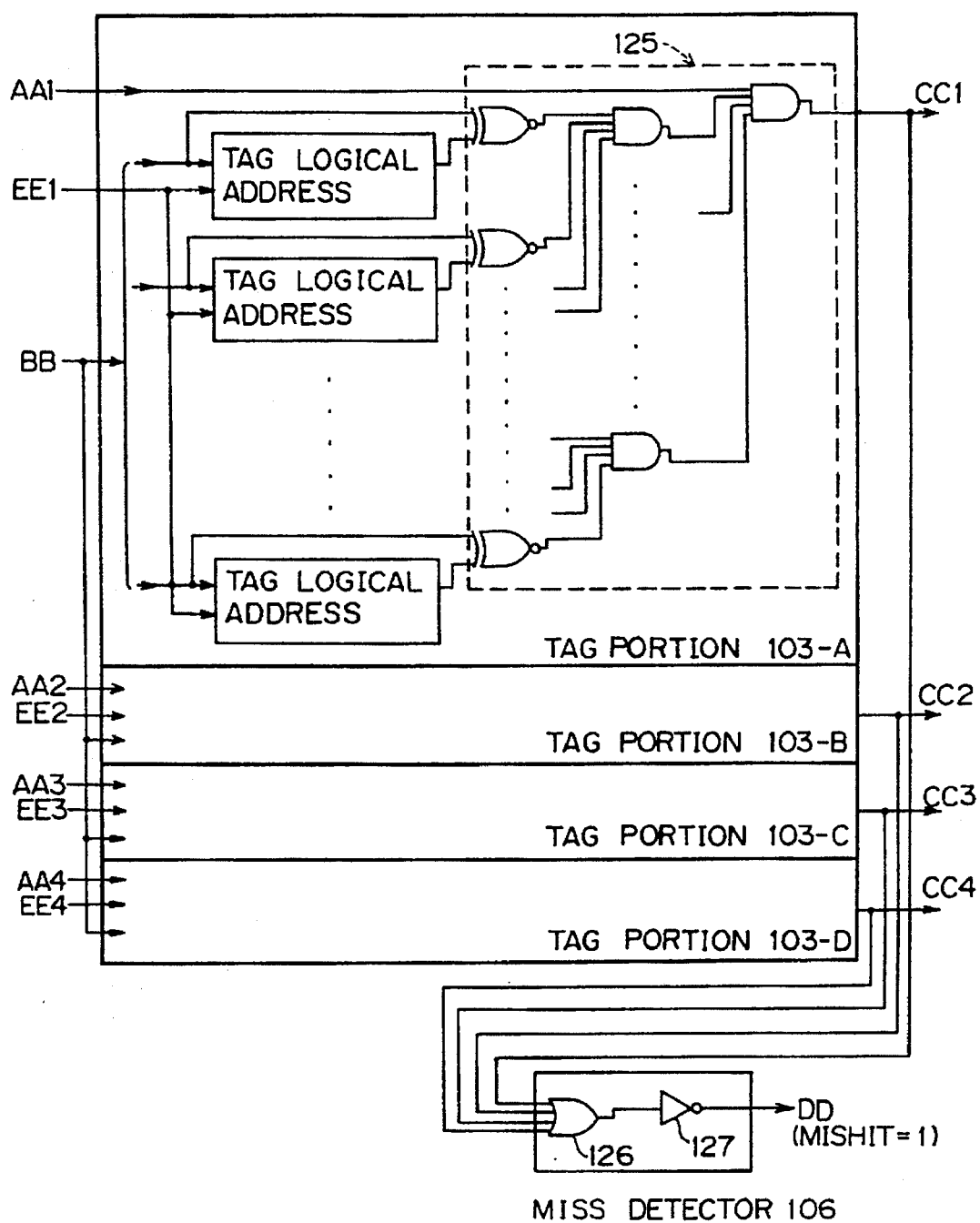
FIG. 17 shows a structure of the TAG portion 103-A to 103-D.

FIG. 17 shows an arrangement of the TAG section. BB indicates an externally applied logical address for comparison which is input simultaneously to each of the TAG sections 103A to 103D.

In each of the TAG sections, the stored logical address and the externally applied logical address are compared by a block 125. When the comparison indicates equality, the block 125 produces a high signal CC. When a signal AA, which is applied from the corresponding V flag storage section 101 to the TAG section to indicate the validity or invalidity of the corresponding entry, is at a low level to indicate invalidity, the signal CC is made low irrespective of the comparison result. The signals CC1 to CC4 output from the TAG sections in the entries A to D are ORed. When all the signals CC1 to CC4 are low, the miss detector 106 presents the miss to all the LRU flag storage sections 102A to 102D by means of a signal DD.

In FIG. 17, miss detecting portion 106 comprises OR circuit 126 for receiving all the signals CC1 to CC4 designating the miss output from respective TAG portions 103A to 103D and inverter 127 for inverting the output of the OR circuit 126 to be output as signal DD.

Further, in the case of a miss, the LRU flag registers 102A to 102D update the physical address of the entry designating the priority "11" and at this time the signal EE1 from the LRU flag registers 102A to 102D are made to receive the comparison data of the logical addresses, thereby performing the updating operation.

In the case of a hit, the following operation is conducted in the present embodiment.

Namely, at a rise of a clock, the TAG portions 103A to 103D receive the comparison data (logical address). The block 125 in FIG. 17 compares the logical address of the TAG portion and the comparison data BB1, thereby outputting the comparison result CC1/CC2/CC3/CC4 and DD. Then, the PFN portions 104A to 104D of the entry which hits output the physical address and exception information, thereby updating the LRU flag registers 102A to 102D based on the comparison result.

Accordingly, the operation in which the logical address is input from a latch having the comparison data, the physical address and exception information are output in the case of a hit and the next latch receiving the hit is performed in a single cycle and the LRU flag registers 102A to 102D perform the operation starting at the time when the upper/lower output of the register is updated and ending at the time when the updated data is latched in the same register.

The present embodiment does not include a latch in the stage for performing the above operation and comprises only logical stages, thereby enabling a circuit scale to be small.

FIG. 18 shows an example of signal at operational cycles of the TLB circuit in the third embodiment of the present invention. In FIG. 18, the cycles T1, T3, T5, T10 and T15 after the resets of all the registers designate the updating cycles of the logical address, the cycles T2, T4, T9 and T15 designate a comparison cycles of the logical addresses, indicating the cycles at which a miss is detected end further the cycles T6, T7, T8, T11, T12, T13, T14 and T17 designate the comparison cycles of the logical addresses, indicating the cycles at which a hit is detected. The logical addresses which are the comparison data input from the outside, namely, X0 to X4 of BB signal designate discretional logical address data.

All of the outputs AA1 to AA4 from the V flag storing section, the signals CC1 to CC4 output as the logical address comparison result from the TAG section, and the timing signals EE1 to EE4 designating the updating timing of the logical address become "0" when the corresponding register is reset. The only signal FF4 selected out of the signals FF1 to FF4 designating the position of the entry at which the logical address is updated at the lowest order of the priority is "1", all the other signals are "0". This corresponds to the fact that the value of the LRU flag as the output of the inverter within the LRU flag storage section shown in FIGS. 12 to 15 is "00" for FIG. 12, "01" for FIG. 13, "10" for FIG. 14 and "11" for FIG. 15 and the priority of the entry D shown in FIG. 9 is at the lowest priority.

At cycle T1, the signal X0 is input as the comparison data BB. In this cycle, the output signals DD from miss detecting portion 106 and signals EE1 to EE4 designating the timing of the updating operation all become "1" and become values different from that obtained after the reset is conducted. This is because none of the logical addressee at the four TAG portions 103-A to 103-D match the input logical address and the cycle T1 is an updating cycle of the logical address as stated above.

The register in the LRU flag storing unit shown in FIGS. 12 to 15 stops the latching operation when the DD signal becomes "1" and restarts the latching operation when the updating timing signals EE1 to EE4 become "1". The signals EE1 to EE4 have priority over the signal DD and thus, when both signals are at "1", the latching operation of the register is performed.

Further, the signals EE1 to EE4 designating the updating timing are input from the bus unit as mentioned above and these signals are kept "0" in a wait state until the physical address and exception flag to be updated are input to the address unit. When all of the signals EE1 to EE4 become "1", one entry of the logical address, physical address and exception flag is updated. The signals EE1 to EE4 are described here as separate signals for respective entries but actually comprise the same signals.

At cycle T2, the signal x0 is stored in the TAG portion 103-D as the logical address which is updated at the cycle T1. AA4 out of the V flags become "1", which designates a valid state and the signal FF4 chosen out of the signals designating the entry position to be updated is changed from "1" to "0" and the signal FF3 chosen out of the signals designating the entry position to be updated is change from "0" to "1" and accordingly the content of the LRU flag is also changed.

The cycle T2 is for comparing the logical addresses and as the comparison data X1 from the outside unit does not match a logical address X0 stored in the TAG portion 103-D, the miss detection signal DD is set to "1"

The cycle T3 is for updating the logical addresses and is different from the cycle T2 in that all the updating taming signals EE1 to EE4 are at "1".

The logical address X1 input at cycle T3 is stored in TAG portion 103-C at cycle T4, and the value of V flag AA3 is set to "1". Therefore, the signals FF1 to FF4 designating the position of the entry at which the updating operation is performed and the values of respective LRU flags are changed.

The cycle T5 is for updating the logical addresses, the signal FF2 out of the signals designating an entry at which the updation operation is performed is at "1" and the corresponding logical address to input from the external unit is stored in TAG portion 103-D at cycle T6. Accordingly, the value of the ERU flag is changed as shown in cycle T6.

At cycle T6, the logical address x0 is input as the comparison data from the external unit. This cycle is for comparing the logical addresses and as the comparison data from the external unit is coincident with the logical address stored in the TAG portion 103-D, the signal CC4 designating the comparison result is output as "1". As a result, the LRU flag corresponding to the TAG portion, namely, the values of LR03 and LR13 become "0" as is shown as the highest order of the priority. The operation as above will continue sequentially.

Figure 19:
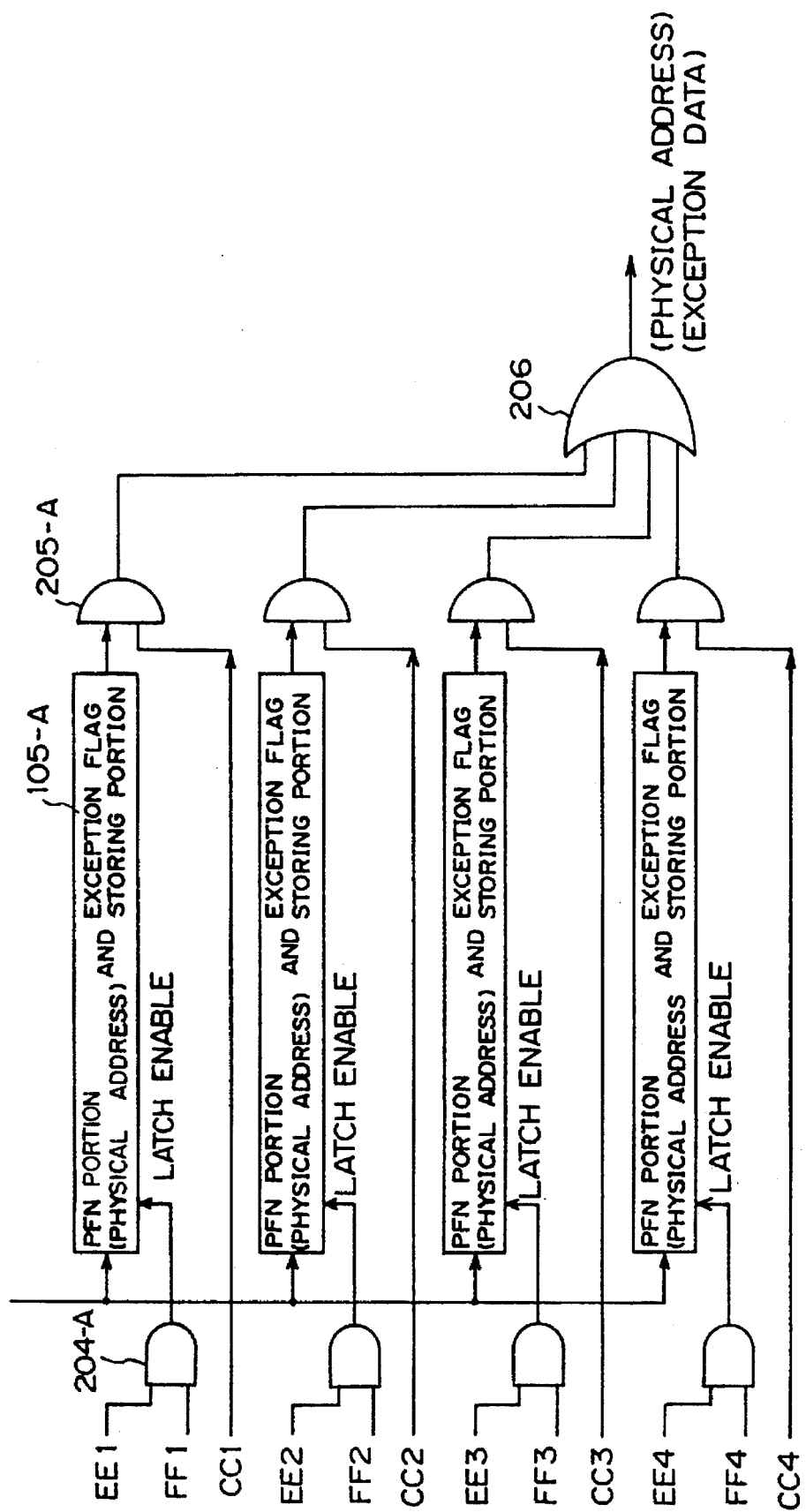
FIG. 19 shows a block diagram of a PFN portion and an exception flag storing portion.

FIG. 19 shows a block diagram of the PFN portion and the exception flag storing portion. When the signal EE1 and the signal FF1 provided to the AND gate 204-A are active, the AND gate 204-A provides a latch enable signal to PFN portion 104A and exception flag storing portion 105A so that the updating data, including the physical address or the exception data, are stored therein. Then the signal CC1 is transmitted, the physical address or exception flag is provided as conversion data to the outside through the AND gate 205-A and OR gate 206. Respective blocks, each including PFN portion 104B, exception flag storing unit 105B, AND gates 204-B and 205-B and signals EE2, FF2 and CC2; PFN portions 204-C, exception flag storing unit 105-C, AND gates 204C and 205C and the signals EE3, FF3 and CC3; and PFN portion 104-B, exception flag storing unit 105-D AND gates 204-D end 205-D, signals EE4, FF4 and CC4 operate in the manner explained above and all the respective blocks correspond to respective entries A to D.

Figures 20A, 20B, 20C:
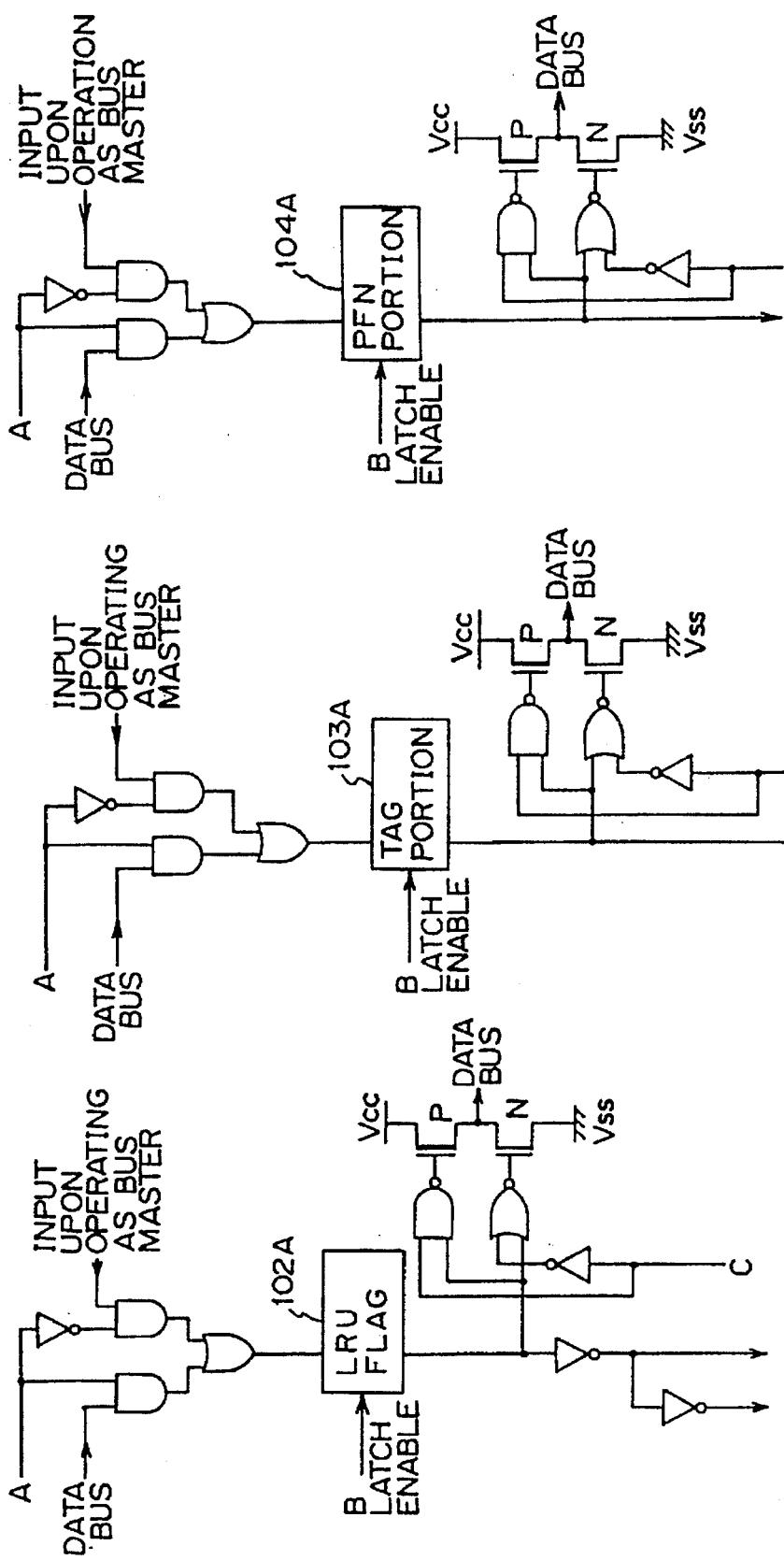
FIGS. 20A to 20C respectively show a LRU flag register, TAG portion register and PFN (page frame number) portion register and their preferable circuits which can be input from and output to the data bus.

FIGS. 20A to 20C show block diagrams in which the LRU flag register 102A, the TAG portion 103A and the PFN portion 104A are respectively used as buffers when this processor operates as a bus slave. In FIG. 20A, the LRU flag can be output to and input from the data bus, the signal A is a read-write test mode signal which is set from the outside of the chip by a user and the signal B is an AND output of the signal obtained by decoding an address input from the outside, the address being equal to 1 in the case of the TLB address and the WRITE enable signal which is equal to 1 when it is active. The signal C is an AND output of the signal obtained by decoding the address input form the outside, read-write test mode signal and the READ enable signal. When the signal A is "1" and the enable signal B is active then the data is input to the LRU flag register and the LRU flag register can be used as a buffer as the processor is a bus slave upon A=1. When the signal C selects the LRU flag register then data is output from the LRU flag register to the data bus through the NOR NAND gates and the inverter circuit comprising a CMOS circuit INV1. When the signal A is at "0" the processor operates as the bus master, the output of the LRU flag register is transmitted from the inverters INV2 and INV3 to the outside circuit in the usual manner.

In the TLB, the flag register designating the priority of respective entries can designate a determined priority sequence upon setting. In the present embodiment, at the bus slave, the effective entries can be directly accessed from the outside unit for a write or read and all the entries including the flag designating the priority can be made "0" to be cleared upon a reset. Also in the present embodiment, at the bus master, the LRU flag storing unit 102A to 102D are structured so that they show a predetermined priority sequence even if the flag registers designating the priorities are made "0" by a reset.

Accordingly, when the vector processor with the TLB control circuit according to the present embodiment operates as the bus slave, the TLB does not perform the address translation and receives an address from the external unit when it operates as the internal register and the respective entries of the TLB have addresses, and therefore, can perform a write/read operation directly from the external bus.

The conventional processor for dividing the frequency of an input clock performs one cycle operation by using several clocks and uses the latches for clock operation. The present embodiment uses a high frequency clock with more than 50 kHz, and thus does not divide the input clock end performs one cycle operation by using one clock. Therefore a series of operations is carried out from a latch to the next latch, namely, from a rise of a clock to a rise of the next clock. As described above, the present invention can simplify the TLB control circuit and determine the validity of the entry based on the valid bit and further maintain the priority of the entry even if all the contents of the register are made "0" to be cleared upon a reset.

Therefore the present embodiment can update the content of the TLB based on the address space switching signal not notifying a switching of the address space and a memory write signal notifying the memory of the write and therefore can use the first information storage means for storing various information. In the case of operation as the bus slave various entries can be used for the data storage unit.

The TAG register 103A and PFN register 104A shown in FIGS. 20B and 20C operate in the same manner as the LRU flag register 102A.

Index registers coupled to the TLB are provided in an address unit. The operation of the index register and the TLB will be described in more detail by referring to the block diagram representing the address unit.

First a mode setting is made for an address translation. An address unit includes four entries of a full set associative TLB. When it operates as a bus master, it translates a logical address to a physical address, thereby performing an address generation. An address translation operation is performed by determining the TLB data, the address translation mode, table size and non-cachable page table size based on the data strobe in the address control register (VACNT). Further, the vector/scalar instruction, the size of the input operand, the size of the output operand and instructions of load/store, load indirect/store indirect, and load mask/store mask are determined by a microcommand, thereby determining an address translation.

The calculation of an address is performed as follows. The address calculation unit performs the main part of an address generation process. The address calculation unit obtains a logical address (LA) based on a base address input from a scalar register (SR), a stride value input from the scalar register (SR) and an index value input from a vector register (VR).

FIG. 21A shows a block diagram of an address calculation unit. An index buffer is formed of eight buffers for providing an index value transmitted from the vector register (VR) in accordance with a clock signal with an interlock control to an address unit operating at a system clock. A pointer for clocking the input buffer with an interlocked clock and a pointer for switching an output buffer by a system clock are provided at the input side and the output side of the index buffer respectively. An index value is written (①)in one index buffer which is subjected to input selection and an index value is read (②) from one index buffer which is subjected to output selection. Input and output of an index value is performed by using four index buffers except for the case of an indirect load instruction and except when bank 0 and 1 ere equal to "1,1".

An index value is selected upon receiving an indirect instruction and a stride value is selected, except for the case of an indirect instruction, depending on the mode of the microcommand (③). Further, the index value or stride value is shifted by two bits toward the high side in one of the following instructions, namely, the LOAD/STORE mask instruction of 64 bits, the bits LOAD/STORE vector 32 bits or the vector mask instruction and an indirect instruction of 32 bits. Except in the above instructions, they are shifted by three bits toward the high side.

However, under the above shift condition, the address value to be generated is limited to the upper side or lower side. In the case of a continuous access of LOAD/STORE vector of 32 bits, or a vector mask is command and the stride =±1, and thus, the address value is corrected when it is translated from the logical address to the physical address.

The shifted data is added to the base address, thereby providing a logical address (LA) (⑤). In the case of an indirect instruction, the above operation is repeated. In the case of an instruction other than an indirect instruction, at first the base address is directly input to the logical address from the scalar register (SR) 4 thereby forming a first logical address (④) and then, the shifted data is added to the logical address, thereby forming a logical address (⑤ and ⑥).

A physical address is generated as follows. A logical address obtained by the address calculation unit is converted to a physical address by an address translation unit. The address translation unit translates a logical address to a physical address by the TLB with four entries or the vector translation register (VTR) with 64 words when the address mode is determined by the data stored in the address control register (VACNT).

Figure 21B:
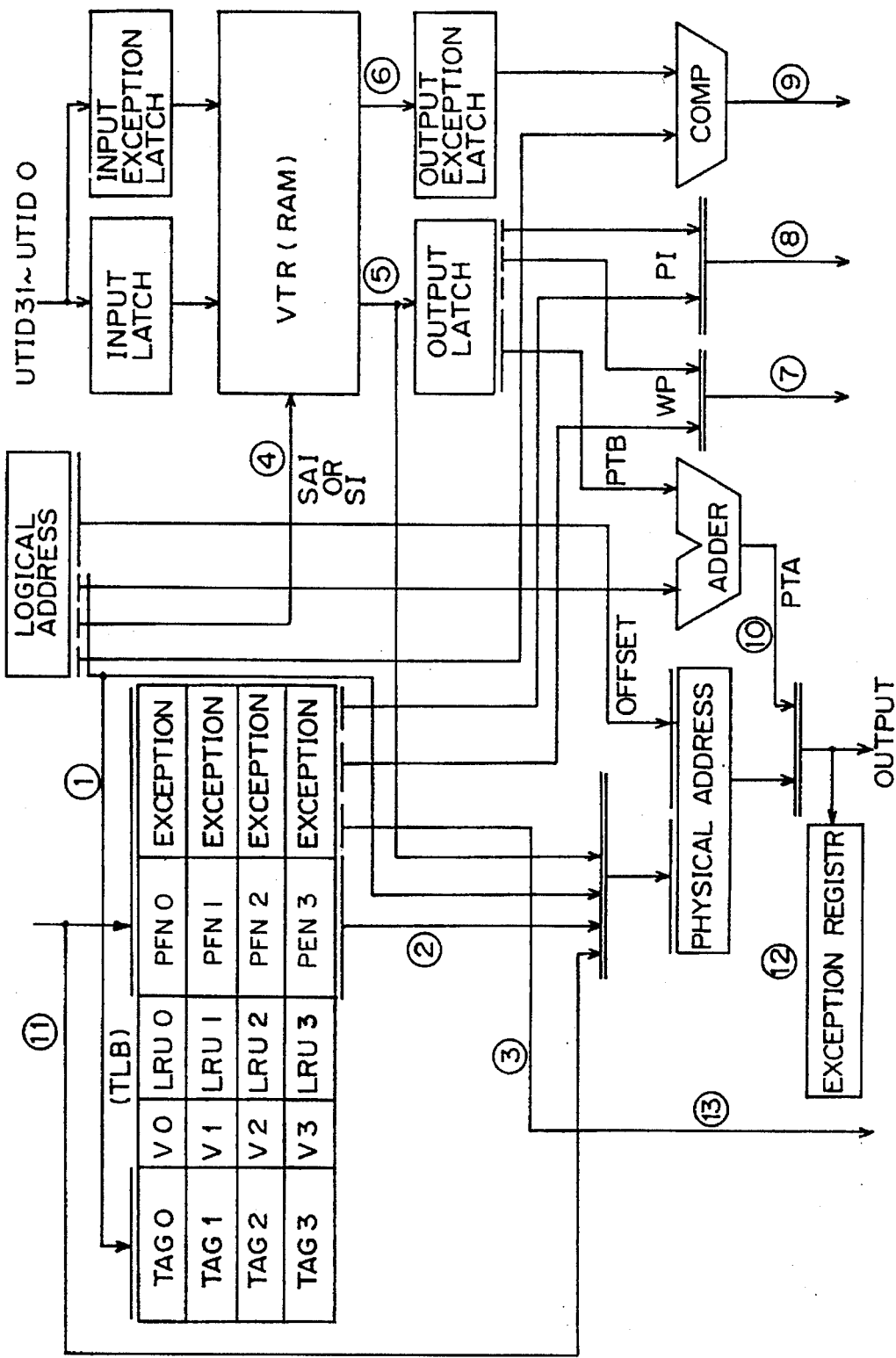

FIG. 21B shows a block diagram of an address translation unit. The address translation unit has three modes, namely, page mode translation, segment mode translation and no address translation and these are determined by the address control register (VACNT).

First, a page mode translation is explained. When page mode is set in VACNT, address translation is performed by using the TLB as a priority which is provided to respective entries in accordance with an LRU algorithm. When a TLB miss occurs, one of the hour entries is updated. The TLB comprises, as described above, a V flag portion designating the validity of the entry, an LRU portion determining the priority in an LRU algorithm, a TAG portion for performing a comparison on the upper 20 bits of the logical address, an exception flag portion with exception information relating to the entry and a PFN portion having the upper 20 bits of the logical address which can be obtained as a result of the translation.

When the TLB obtains the upper 20 bits of logical address data from LA (⑪), it performs a comparison with the TAG portion for all the entries. When the entry which is shifted represent a valid v flag, the upper 20 bits of data of the physical address is output from the PFN (page frame number) portion of the entry and the exception information of the entry is output from the flag portion (⑫ and ⑬).

A physical address (PA) is generated from the offset data corresponding to the lower 12 bits of the LA and the upper 20 bits of the aforementioned physical address.

The address translation portion reads LAID (logical address identifier of 8 bits), PTB (page table base) of 26 bits, WP (write protection) of 1 bit and PI (page invalid) of 1 bit from the VTR by using 6 bit addresses of SAI (section address index) from the LA simultaneously with the TAG comparison operation performed in the TLB portion (⑮, ⑯). The LAID of the LA is compared with the LAID of the VTR and if they are coincident the logical address of a flow exception (OF) is generated (⑰). When the TLB is hit, NCAO (non-cachable out) is output from an external pin portion by using the exception information flag output from the hit entry, and the write protection exception (WP) and page invalid exception (PI) are outputted as the respective output exception information bits (⑱, ⑲ and ㉓).

When the upper 20 bits of LA are compared with the TAG of the TLB, if all the V flags of the TLB represent an invalid entry or an entry whose hit does not exist in the entry in which the valid V flag (TLB miss), then the PFN portion with the entry having the lowest priority is updated.

When a TLB miss is detected, 32 bit data is obtained by appending "0" of 6 bits to the lower end of the PTB (26 bits) of the VTR output and is added to the 8 to 12 bit data obtained by appending "0" of 2 bits to the lower end of the page index of 6 to 10 bits from the LA, thereby outputting the PTA (page table address) (⑳). A page table in an external main memory is retrieved by the PTA and the PFN of the TLB and updated through the data bus by the TLB updated data, then the update data is input to the PA as the upper side data of 20 bits of the physical address (㉑).

At this time, based on the exception information flag of the update data, exception information bits for the write protection exception/page valid exception and output of the NCAO signals are output.

When the upper 20 bits of the LA are compared with the TAG of the TLB.

Next the segment mode is explained. When the setting of the VACNT is for segment mode, the TLB is not used for the address translation and only the VTR is used. The LAID of 4 to 8 bits, FSFN (four segment frame number of 10–14 bits) WP of 1 bit and PI of 1 bit are read from VTR using SI (sequent index) address of 6 bits of the LA (⑮ and ⑯). The LAID of the LA is compared with the LAID of the VTR. When they are not coincident, the picked up address overflow exception (OF) is generated (⑰). The write protection exception/page invalid exception are detected (⑱ and ⑲) by using the WI and PI bits from the VTR. The physical address is generated from the SFN from the VTR and offset value LA.

When a mode of no address translation is set in VACNT, the upper side 20 bit data of the LA and the offset data according to the lower side 12 bit data of the LA are input to the PA and the logical address is made equal to the physical address. At this time write protection exception, page invalid exception and logical address overflow exception are not detected. The physical address input from the address translation unit or PTA is input to the VEXA (vector exception address) by using the enable signal also used for latching of the address for outer pin portion (㉒), thus the VEXA maintains the address data in which the exception occurs, and the operation is stopped due to the occurrence of the exception and the address data output at the last stage is maintained when the operation ends normally.

Figure 22A:
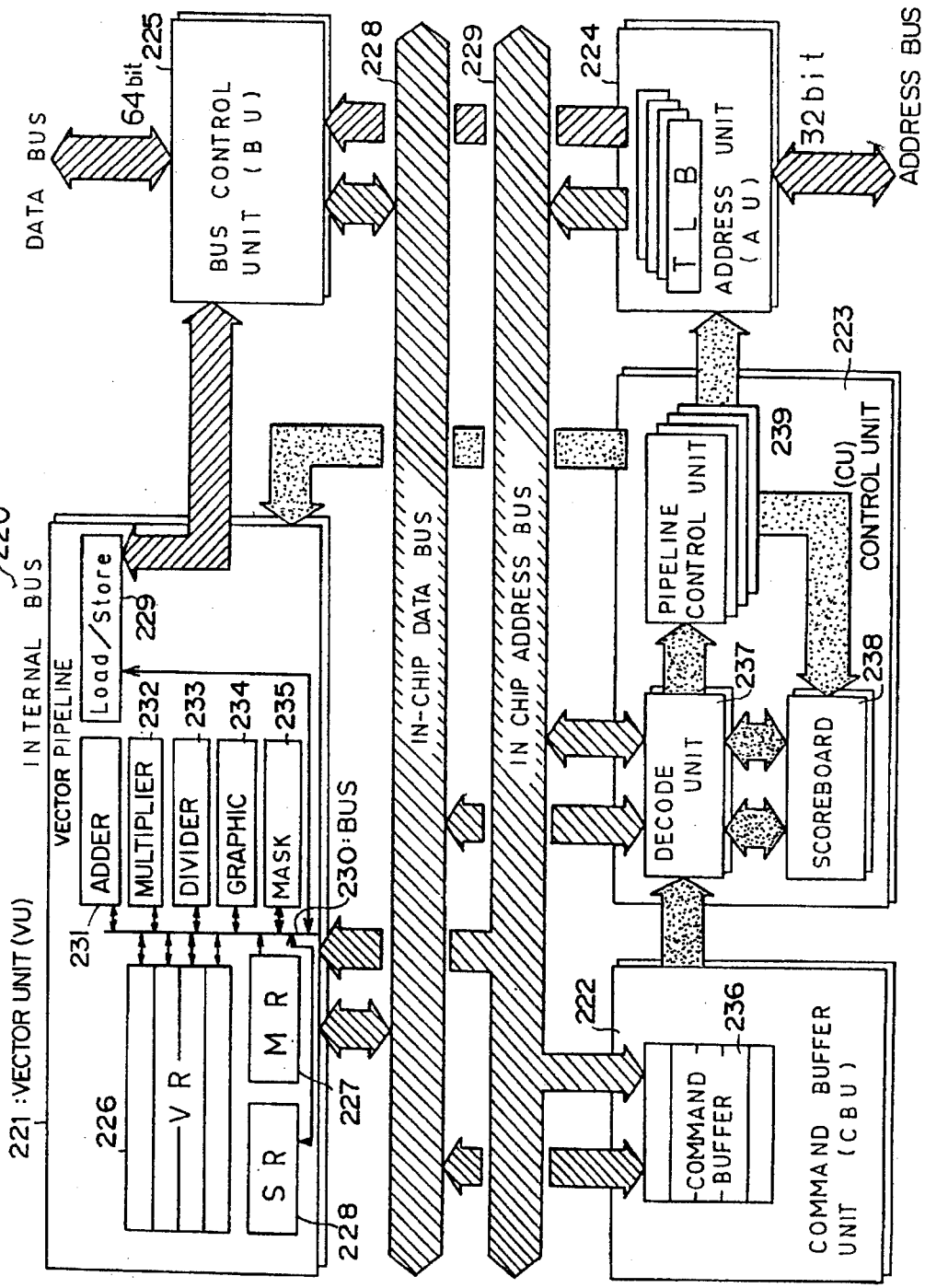
FIGS. 22A and 22B shows a block diagram of a vector processor unit in which the address unit shown in FIG. 21A and 21B are provided.

FIG. 22A shows a configuration of the vector processor unit (VPU) in which the above-recites embodiments of invention are used.

The vector processor unit (VPU) comprises a vector unit (VU) 221, a command buffer unit (CBU) 222, a control unit (CU) 223, an address unit (AU) 224, and a bus control unit (BU) 225.

The vector unit 221 for performing a vector operation comprises an 8 KB vector register (VR) 226, a 64-byte mask register (MR) 227, a 128-byte scalar register (SR) 228, and a vector pipeline comprising an adder 231, a multiplier 232, a divider 233, a graphic processor 234, a mask processor 235, and a load/store pipe 229 for reading data to the registers, and storing data in a memory, which are connected through and internal bus 231. The vector unit 221 functions as the important part of the vector processor unit.

The control unit 223 comprises decoder 237, score board 238 and pipeline control unit 239. The address unit 224 comprises an output address generating unit and an address control unit which are not shown.

Figure 22B:
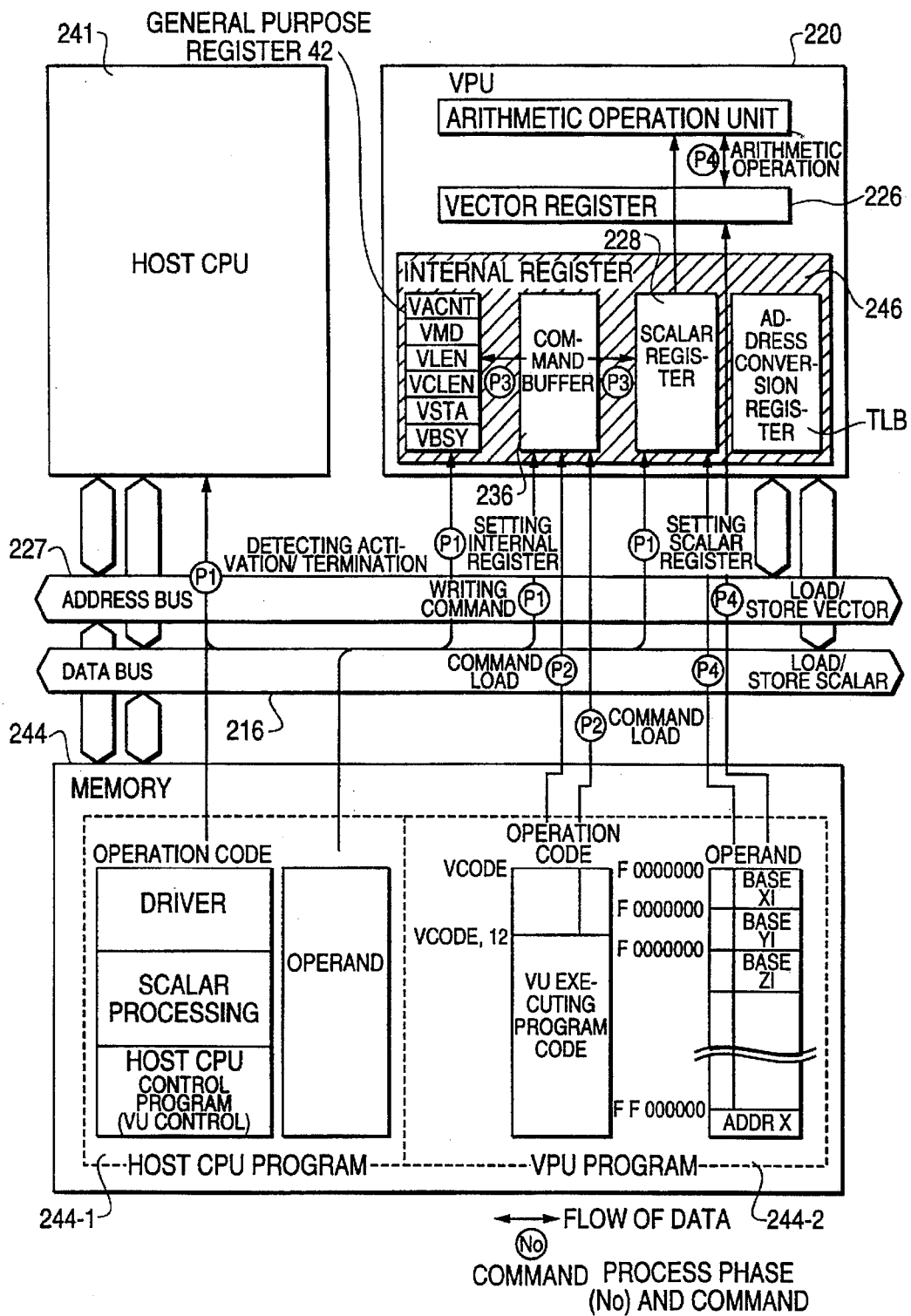

As shown in FIG. 22B, a central processing unit 241 comprising a host CPU, and the vector processor unit VPU 220, are connected by a system bus SB and slave interfaces. When the central processor unit 241 performs vector operations, etc., the vector processor unit 220 is accessed in the following procedure.

FIG. 22B explains the controlling process between the central processor unit 241 and the vector processor unit 220. In phase P1, the central processor unit 241 executes a control program (VU control) pre-stored in the memory 244 and then initializes internal registers in the vector processor unit 220, for example, a register for the vector length, etc. A host processor program area in the memory 244 comprises an operation code area including a soft driver, scalar process, and host main processor control programs and an operand area. Then, the central processing unit 241 activates the vector processor unit 220 when the initialization is completed. This permits the vector processor unit 220 to read an operation code in the VU program area in phase P2 and read it in the command buffer. That is, a command is loaded. Then, in phase P3, command buffer 236 stores the loaded command and outputs the instruction corresponding to each operation to an general purpose internal register 142 and the scalar register 228. Then in phase P4, the vector processor unit 220 performs target operations in parallel and target processes in the pipeline mode. At this time, in the scalar process the data of the operand in the VPU program area are loaded in the scalar register 228, end the result obtained by the arithmetic operation unit (vector pipeline) is stored in the operand area. By contrast, in the vector process, it is loaded and stored through the vector register 226.

When the above described process is completed, the central processor unit 241 accesses a register in the vector processor unit 220, reads the completion state, and determines whether or not the process has terminated normally.

In the operation above, a memory 244 is accessed in the scalar and the vector processes in the embodiment of the present invention. At this time, if a bus-use-right release signal indicating the active state is applied from the central processor unit 241, etc., the bus-use-right release signals etc. are detected with the access response signal in the cycle in which the access response signal is detected so that the number of memory access addresses equal that of the pieces of the data to be processed.

What is claimed is:

1. A processor having an address unit with an index buffer circuit comprising:
   a plurality of buffers;
   input pointer generating means for generating an input control signal for determining a first selected buffer of said plurality of buffers in a buffer portion, into which index data is to be stored;
   input selecting means for selecting index data based on the input control signal and supplying said index data to said first selected buffer, said first selected buffer storing said index data;
   output pointer generating means for outputting a control signal for determining a second selected buffer from which output data is to be read;
   output selecting means for selecting output data based on the control signal, thereby outputting it;
   translation look-aside buffer (TLB) means for storing a translation pair comprising a logical address and physical address for use in an address translation, said TBL means comprising an input for entering information from an output of said index buffer-circuit;
   first information storing means for storing information corresponding to respective entries of a plurality of entries, each information indicating whether a corresponding respective entry of said TLB means is valid or invalid;
   second information storing means for storing a plurality of information designating priorities of said respective entries in said TLB means, each respective entry having a respective priority;
   priority designating means for designating preselected priorities for respective entries when each information of said plurality of information to be stored in the second information storing means indicates an invalid value;
   comparison judging means for comparing logical addresses previously determined for respective entries in the TLB means with comparison data received from an outside unit and producing comparison results, each respective entry having a corresponding logical address and each corresponding logical address being compared with corresponding comparison data to produce a respective comparison result, and judging, based on the comparison results, whether the comparison data are hits in the TLB means, said judging of the comparison data being performed based on each comparison result; and
   logical address storing means for storing the logical addresses to be supplied to said comparison judging means and for performing updating operations of said logical addresses based on updated data sent from the outside unit based on the judgment result obtained from said comparison judging means.

2. The processor according to claim 1, further comprising means for producing a reset signal for initializing said input pointer generator and said output pointer generator and for synchronizing said index data with said output data.

3. The processor according to claim 1 wherein said index buffer circuit comprises control means for stopping output control of said output pointer generating means in response to an output inhibit signal, when contents of said second selected buffer has not been updated upon reading of the output data from said plurality of buffers.

4. The processor according to claim 1, further comprising exception information storing means for storing exception information for said logical address storing means and updating the exception information based on the updated data sent from the outside unit simultaneously with the updating operation of said logical address storing means.

5. The processor according to claim 1, wherein:
   the information to be stored in said first information storing means is generated based on an address space switching means which notifies a switching operation of an address space and an installed memory write signal which notifies the installed memory of a write operation; and
   when said processor operates as a bus slave with regard to a system bus, said address translation is stopped and said respective entries store said information.

6. The processor according to claim 1, wherein said first information storing means comprises least-recently-used (LRU) flag registers, each LRU flag register indicating the respective priority of the respective entry.

7. The processor according to claim 1, wherein said first information storing means comprises means for storing TAG portions for comparing stored logical addresses of the logical addresses stored and externally supplied logical addresses and producing comparison results.

8. The processor according to claim 1, wherein said first information storing means comprises page frame number storing means for storing physical addresses corresponding to internally stored logical addresses.

9. The processor according to claim 1, wherein said priority designating means perform an operation in accordance with a least-recently-used (LRU) algorithm.

10. A processor system according to claim 1 further comprising:

a vector processor unit with said address unit and said index buffer disposed therein;

a memory coupled to said vector processor unit; and a central processor unit, coupled to said vector processor unit and said memory, for controlling access by said vector processor unit to said memory.

11. A processor system according to claim 1 further comprising:

a vector processor unit with said address unit provided with said translation look-aside buffer means disposed within said vector processor unit;

a memory coupled to said vector processor unit; and a central processor unit, coupled to said vector processor unit and said memory, for controlling access of said vector processor unit to said memory.

* * * * *

UNITED STATES PATENT AND TRADEMARK OFFICE
CERTIFICATE OF CORRECTION

PATENT NO. : 5,644,748
DATED : July 1, 1997
INVENTOR(S) : Shinichi UTSUNOMIYA, et al.

It is certified that error appears in the above-indentified patent and that said Letters Patent is hereby corrected as shown below:

Column 4

Line 54, "n-1" should be --1-n--.

Column 5

Line 56, "Q" should be --a--.

Column 6

Line 36, "mNi" should be --ENi--.

Column 7

Line 60, "Control" should be --control--.

Column 8

Line 58, "such" should be --each--.

Column 10

Line 5, "CCL" should be --CC1--.

Line 58, "Storage" should be --storage--.

Column 11

Line 30, "pert" should be --part--.

Line 55, "mass" should be --miss--.

Line 60, "ere" should be --are--.

Column 12

Line 43, delete "≠".

Column 13

Line 41, "T15" should be --T16--.

UNITED STATES PATENT AND TRADEMARK OFFICE
CERTIFICATE OF CORRECTION

PATENT NO. : 5,644,748
DATED : July 1, 1997
INVENTOR(S) : Shinichi UTSUNOMIYA, et al.

It is certified that error appears in the above-indentified patent and that said Letters Patent is hereby corrected as shown below:

<u>Column 14</u>

Line 39, "taming" should be --timing--.

Line 52, "ERU" should be --LRU--.

<u>Column 15</u>

Line 8, "204-C" should be --104-C--.

Line 11, "end" should be --and--.

Line 61, "end" should be --and--.

<u>Column 16</u>

Line 4, delete "not".

Line 51 "ere" should be --are--.

Line 66, "=±t1," should be ---=±1,--.

<u>Column 19</u>

Line 21, "end" should be --and--.

Signed and Sealed this

Twenty-eighth Day of October, 1997

Attest:

BRUCE LEHMAN

Attesting Officer     Commissioner of Patents and Trademarks